US012807823B2

(12) United States Patent
Stellnberger et al.

(10) Patent No.: US 12,807,823 B2
(45) Date of Patent: Nov. 24, 2026

(54) COATING COMPOSITION COMPRISING AN ALKALI SALT OF GRAPHENE OXIDE AND COATING LAYERS PRODUCED FROM SAID COATING COMPOSITION

(71) Applicants: BASF COATINGS GMBH, Münster (DE); VOESTALPINE STAHL GMBH, Linz (AT)

(72) Inventors: Karl-Heinz Stellnberger, Linz (AT); Patrick Keil, Münster (DE); Susanne Piontek, Münster (DE); Juergen Schodl, Wiener Neustadt (AT); Peter Velicsanyi, Wiener Neustadt (AT); Josef Hagler, Linz (AT); Guenter Fafilek, Vienna (AT); Walter Pernkopf, Ybbsitz (AT)

(73) Assignee: BASF COATINGS GMBH, Muenster (DE)

( * ) Notice: Subject to any disclaimer, the term of this patent is extended or adjusted under 35 U.S.C. 154(b) by 377 days.

(21) Appl. No.: 18/249,328

(22) PCT Filed: Oct. 13, 2021

(86) PCT No.: PCT/EP2021/078292

§ 371 (c)(1),
(2) Date: Apr. 17, 2023

(87) PCT Pub. No.: WO2022/084119

PCT Pub. Date: Apr. 28, 2022

(65) Prior Publication Data

US 2023/0399524 A1 Dec. 14, 2023

(30) Foreign Application Priority Data

Oct. 22, 2020 (EP) .................................... 20203402

(51) Int. Cl.

| | |
|---|---|
| ***C09D 5/08*** | (2006.01) |
| ***C08K 3/04*** | (2006.01) |
| ***C09D 7/20*** | (2018.01) |
| ***C09D 7/61*** | (2018.01) |
| ***C09D 133/08*** | (2006.01) |
| ***C09D 163/00*** | (2006.01) |
| ***C09D 167/02*** | (2006.01) |
| ***C09D 175/04*** | (2006.01) |

(52) U.S. Cl.

CPC ............... *C09D 5/084* (2013.01); *C09D 7/20* (2018.01); *C09D 7/61* (2018.01); *C09D 133/08* (2013.01); *C09D 163/00* (2013.01); *C09D 167/02* (2013.01); *C09D 175/04* (2013.01); *C08K 3/042* (2017.05)

(58) Field of Classification Search

CPC . C09D 5/084; C09D 7/20; C09D 7/61; C09D 133/08; C09D 163/00; C09D 167/02; C09D 175/04; C08K 3/042

See application file for complete search history.

(56) References Cited

U.S. PATENT DOCUMENTS

| | | | | |
|---|---|---|---|---|
| 2017/0037257 A1* | 2/2017 | Yang | .................... | C09D 5/1618 |
| 2020/0165410 A1* | 5/2020 | Kamar | .................... | C08K 3/042 |

FOREIGN PATENT DOCUMENTS

| | | |
|---|---|---|
| CN | 108047618 A | 5/2018 |
| CN | 109135504 A | 1/2019 |
| CN | 109554007 A | 4/2019 |
| CN | 109593439 A | 4/2019 |
| CN | 110551411 A | 12/2019 |
| CN | 109181490 B | 1/2020 |

OTHER PUBLICATIONS

Chavali et al., "Graphene-based intumescent flame retardant on cotton fabric", Journal of Material Science, vol. 55, No. 29, pp. 14197-14210. Jul. 8, 2020 (Year: 2020).*

International Search Report and Written Opinion for corresponding PCT/EP2021/078292 mailed Jan. 25, 2022; 11 pages.

Asaldoust et al., "Construction of a unique anti-corrosion nanocomposite based on graphene oxide@Zn3PO4/epoxy; experimental characterization and detailed-theoretical quantum mechanics (QM) investigations", Construction and Building Matrials, vol. 256, 119439 (2020).

Kuila et al., "Chemical functionalization of graphene and its applications", Progress in Materials Science, vol. 57, pp. 1061-1105 (2012).

Mohammadkhani et al., "Designing a dual-functional epoxy composite system with self-healing/barrier anti-corrosion performance using graphene oxide nano-scale platforms decorated with zinc doped-conductive polypyrrole nanparticles with great environmental stability and non-toxicity", Chemical Engineering Journal, vol. 382, 122819 (2020).

* cited by examiner

*Primary Examiner* — Blaine Copenheaver

(74) *Attorney, Agent, or Firm* — Armstrong Teasdale LLP

(57) ABSTRACT

Described herein is a coating composition including at least one graphene oxide including at least one monovalent metal ion selected from the group consisting of lithium, potassium and mixtures thereof (GO-M), at least one binder B and/or at least one silane compound SC, and at least one solvent S1. Also described herein is a process to produce the coating composition, a method to produce at least one coating layer on a substrate by using the coating composition and a coating layer or multilayer coating obtained by said method. Also described herein is a method of using graphene oxide including at least one monovalent metal ion selected from the group consisting of lithium, potassium and mixtures thereof in coating compositions to improve corrosion resistance of said coating compositions.

18 Claims, No Drawings

COATING COMPOSITION COMPRISING AN ALKALI SALT OF GRAPHENE OXIDE AND COATING LAYERS PRODUCED FROM SAID COATING COMPOSITION

CROSS-REFERENCE TO RELATED APPLICATIONS

This application is a U.S. National Phase Application of PCT/EP2021/078292, filed Oct. 13, 2021, which claims the benefit of priority to European Patent Application No. 20203402.1, filed Oct. 22, 2020, the entire contents of which are hereby incorporated by reference herein.

The present invention relates to a coating composition comprising at least one graphene oxide containing at least one monovalent metal ion selected from the group consisting of lithium, potassium and mixtures thereof (GO-M), at least one binder B and/or silane compound SC and at least one solvent S1. Moreover, the present invention relates to a process to produce the inventive coating composition, a method to produce at least one coating layer of on a substrate by using the inventive coating composition as well as a coating layer or multilayer coating obtained by said process. Finally, the present invention relates to the use of graphene oxide containing at least one monovalent metal ion selected from the group consisting of lithium, potassium and mixtures thereof in coating compositions to improve the corrosion resistance of said coating compositions.

State of the art

The corrosion of metallic materials presents a problem which has not been satisfactorily solved until today. Corrosion—which is the electrochemical reaction of a metallic material with its atmospheric surroundings, more particularly oxygen and water—leads to significant alterations and damage of the material. Said damage results in impairment of the function of metallic components which then need to be repaired or replaced. The corresponding economic significance of corrosion, and thus also of protection against corrosion, is therefore highly relevant.

It is for these reasons that great importance is accorded to corrosion control across virtually all sectors of the metal industry (examples being mechanical engineering and equipment, automotive industry (vehicle construction), aviation and aerospace industry, shipbuilding industry, electrical industry, precision mechanics industry, building industry and household appliances/"white goods"), but especially in the sectors of the automotive and aviation industry. Particularly in the latter sectors, metallic substrates are used very extensively as components which are exposed to atmospheric conditions, in some cases to extreme atmospheric conditions.

In the finishing of vehicles and in the aviation industry, metallic substrates are typically subjected to an expensive multilayer coating procedure. This is necessary in order to be able to meet the requirements of the vehicle-making and aviation industries—which include effective corrosion control, for example.

Commonly, a conversion coating is first applied to the metallic substrate which protects said substrate against corrosion and improve the adhesion to overlying coating layers. Examples include the phosphatizing of steel substrates or the chromating of aluminum substrates or aluminum alloys, examples being aluminum alloys of the 2000 to 7000 series, like e.g. AA2024, AA5083, AA6111, AA6014, AA6061 and AA7075. The latter finds application primarily in the aviation industry on account of its very good processing properties, its low density and at the same time resistant nature with respect to physical stressing. At the same time, however, the material has a propensity toward the hazardous filiform corrosion, where, often after physical damage to the substrate coating in conjunction with high atmospheric humidity, the corrosion propagates in filament form beneath the coating of the substrate and produces filiform corrosion damage to the metallic substrate. Effective corrosion control, accordingly, is important.

Following the pretreatment and the construction of appropriate conversion coats, a primer coat is normally applied which provides further protection from corrosion. This primer coat is based on an organic-polymeric matrix and may further comprise anticorrosion pigments described later on. In the context of the automotive industry, this primer coat generally constitutes an electrodeposition coating, more particularly a cathodic electrocoat, also known as ED-coat. In the aircraft industry, special epoxy resin-based primers are usually employed. In the automotive finishing sector, a surfacer coating is then generally applied to compensate any unevenness still present on the surface of the coated substrate and to protect the cathodic electrocoat from stone chip damage. In the last step, a topcoat is applied, which is composed of two separately applied coats, namely a basecoat and a clearcoat.

One effective form of corrosion protection of metallic substrates still used nowadays is the use of chromate compounds. Chromate compounds are contained, for example, in conversion coats as part of the surface pretreatment of metallic substrates (also called chromating). Frequently, likewise, chromate compounds in the form of chromate salts (e.g., barium chromate, zinc chromate, strontium chromate) are used as anticorrosion pigments in anticorrosion coating compositions, preferably primers, primer-surfacers or fillers, based on organic-polymeric resins.

The corrosion protection effect of chromate compounds in conversion coats is achieved by etching of the metallic surface (aluminum, for example) and simultaneous proportional reduction of the chromate compounds to trivalent chromium while low-solubility passivation coats contain aluminum (III)/chromium (III)/chromium (VI) oxide hydrates to achieve a corrosion protection effect.

Problems, however, are associated with the high toxic and carcinogenic effect of chromate compounds. Avoiding chromate compounds in the vehicle, household and aviation industry while at the same time retaining appropriate protection from corrosion has therefore been a longstanding need within the corresponding branches of industry.

An example of one possible approach for avoiding chromate compounds while at the same time retaining an appropriate protection from corrosion is the use of oxo anions (and/or salts thereof) of various transition metals, such as $MoO_4^{2-}$, $MnO_4^-$ and $VO_3^-$, for example. Also known is the use of lanthanoid cations or different organic species such as, for example, benzotriazoles, ethylenediaminetetraacetic acid (EDTA), quinoline derivatives or phosphate derivatives. The underlying mechanisms of action are complex and even now are still not fully understood. They range from the formation of passivating oxide/hydroxide coats on the corroding metal surface to the complexation of certain metal cations (Cu (II), for example), resulting in the suppression of specific forms of corrosion (an example being the filiform corrosion of aluminum-copper alloys).

A further approach lies in the use of so-called nanocontainer materials and/or layer structure materials such as, for example, organic cyclodextrins or inorganic materials such as zeolites, alumina nanotubes and smectites. Also in use are hydrotalcite components and layered double hydroxide materials. The latter are usually referred to in the general technical literature together with the corresponding abbreviations "LDH". In the literature they are frequently described by the idealized general formula $[M_2{}^{2+}{}_{(1-x)}M_3{}^{3+}x(OH)_2]^{x+}[A_y{}^{-}{}_{(x/y)}nH2O]$ or similar empirical formulae. In these formulae, $M_2$ stands for divalent metallic cations, $M_3$ for trivalent metallic cations, and A for anions of valence x. In the case of naturally occurring LDH these are generally inorganic anions such as carbonate, chloride, nitrate, hydroxide and/or bromide. Various further organic and inorganic anions may also be present in synthetic LDH. The general formula above also takes the crystal water into account. In the case of hydrotalcites, the divalent cation is $Mg^{2+}$, the trivalent cation is $Al^{3+}$, and the anion is carbonate, although the latter may be substituted at least proportionally by hydroxide ions or other organic and also inorganic anions. The hydrotalcites and LDH have a layer-like structure similar to that of brucite ($Mg(OH)_2$), in which a negatively charged layer of intercalated anions generally also containing the crystal water is present between each pair of positively charged metal hydroxide layers due to the presence of positively charged trivalent metal cations. In the formula shown above, the LDH layer structure is accounted for by the brackets placed accordingly. Between two adjacent metal hydroxide layers various agents can be intercalated, examples being anticorrosion agents referred to above, by means of noncovalent, ionic and/or polar interactions.

The nanocontainer materials and/or LDH materials previously described can be incorporated directly into corresponding coating materials based on polymeric binders, such as conversion coating materials and/or primer coating materials. Attempts are also being made to replace the conversion coats completely, in which case the corresponding primers are then applied directly to the metal. In this way, the coating procedure is made less complicated and hence more cost-effective.

In recent years work has focused on incorporating graphene, a one-atom or few-layer thick sheet of crystalline graphite, or graphene oxide into corrosion protective coatings due its excellent chemical resistance, mechanical strength and impermeability to gases and corrosive ions. Compared with graphene, graphene oxide has more oxygen-containing organic functional groups on the surface which increase the compatibility and joint surface structure with some organic resins, such as epoxy resin. However, the incorporation of graphene oxide into organic coatings has not proven to fully satisfy the corrosion protection requirements in the automotive, aviation, household and building industry.

Of advantage accordingly would be a coating composition having excellent corrosion protection without the use of toxic compounds, such as chromium and other heavy metal compounds as well as fluoro-compounds and phosphate-containing compounds. Said coating composition should have an excellent storage stability and should be applicable with commonly used application devices. Moreover, said composition should have excellent adhesion to the metal substrate as well as any under-and/or overlying coating layers so that direct application on the metal without prior use of conversion layers as well as the application of further coating layers to produce multilayer coatings is possible.

Object

The object of the present invention, accordingly, was that of providing a coating composition having excellent corrosion protection without the use of toxic compounds, such as chromium and other heavy metal compounds, fluoro-compounds and phosphate-containing compounds. The coating composition should have excellent storage stability and should be applicable with commonly used application devices. Moreover, the coating composition should have a high pot life, a high adhesion to the substrate as well as to any under-and/or overlying coating layers. Thus, the coating composition should also allow to be overcoated without any problems with commonly used coating compositions, such as filler, basecoat and/or topcoat compositions. Moreover, the coating composition should result in coating layers having a sufficient flexibility to allow deformation of the coating substrate without the formation of cracks in the coating layer obtained from the inventive coating composition.

Technical Solution

The objects described above are achieved by the subject matter claimed in the claims and also by the preferred embodiments of that subject matter that are described in the description hereinafter.

A first subject of the present invention is therefore a coating composition comprising a) at least one graphene oxide containing at least one monovalent metal ion selected from the group consisting of lithium, potassium and mixtures thereof (GO-M);

b) at least one binder B and/or at least one silane compound SC; and c) at least one solvent S1.

The above-specified coating composition is hereinafter also referred to as coating composition of the invention and accordingly is a subject of the present invention. Preferred embodiments of the coating composition of the invention are apparent from the description hereinafter and also from the dependent claims.

In light of the prior art it was surprising and unforeseeable for the skilled worker that the object on which the invention is based could be achieved by using a graphene oxide containing lithium and/or potassium ions (referred to as graphene oxide salt hereinafter). The incorporation of said graphene oxide salt into liquid coating compositions comprising at least one binder (i.e. organic coating compositions) and/or at least one silane compound (hereinafter also called conversion coatings) results in significantly improved corrosion resistance when compared to coating compositions comprising graphene oxide or coating compositions only comprising the binder and/or the silane compound. Despite the presence of the graphene oxide salt, the inventive coating compositions have an outstanding storage stability, a high pot life and can be applied by commonly used application gear, such as pneumatic or electrostatic spray guns, roller application, or coil coating. Additionally, the inventive coating compositions show excellent adhesion to the substrate and can therefore be applied directly to the substrate without the need to previously apply a conversion coating layer. Furthermore, the inventive coating compositions also have an excellent adhesion to further under- and/or overlying coating layers, thus rendering them readily suitable in processes for preparing multilayer coating systems as primers, primer-surfaces or fillers. Moreover, the flexibility of coating layers obtained from the inventive coating composition is not negatively impaired by the addition of the graphene oxide salt, thus reducing crack formation of the coating layer produced by the inventive coating composition upon bending of the coated substrate.

A further subject of the present invention is a process for preparing an inventive coating composition comprising the following steps:

(a) preparing a dispersion D of at least one graphene oxide comprising at least one monovalent metal ion selected from the group consisting of lithium, potassium and mixtures thereof (GO-M) in at least one solvent S2; and
(b) adding the dispersion D prepared in step (a) to a mixture containing at least one binder B and/or at least one silane compound SC and at least one solvent S1.

Another subject of the present invention is a method of forming at least one coating layer on a substrate(S) comprising the following steps:

(i) applying an inventive coating composition or a coating composition prepared by the inventive process directly on the substrate(S);
(ii) forming a film from the coating composition applied in step (i) by curing said coating composition; and
(iii) optionally applying at least one further coating composition to the coating layer formed in step (il) and curing said coating composition.

Yet another subject of the present invention is a coating layer or multilayer coating (MC) produced by the inventive method.

A final subject of the present invention is the use of at least one graphene oxide containing at least one monovalent metal ion selected from the group consisting of lithium, potassium and mixtures thereof in coating compositions to improve the corrosion resistance of said coating composition.

DETAILED DESCRIPTION

The measurement methods to be employed in the context of the present invention for determining certain characteristic variables can be found in the Examples section. Unless explicitly indicated otherwise, these measurement methods are to be employed for determining the respective characteristic variable. Where reference is made in the context of the present invention to an official standard without any indication of the official period of validity, the reference is implicitly to that version of the standard that is valid on the filing date, or, in the absence of any valid version at that point in time, to the last valid version.

The term "graphene oxide" generally refers to oxidized graphene having the following general structure (A)

(A)

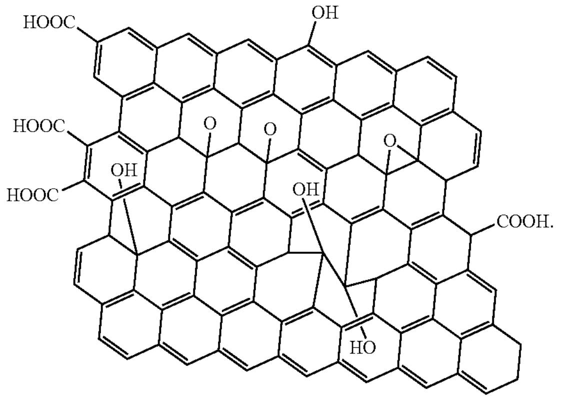

Graphene oxide comprising at least one monovalent metal ion thus refers to graphene oxide in which at least one carboxylic acid group is converted to at least one carboxylate group having at least one monovalent metal counterion.

All film thicknesses reported in the context of the present invention should be understood as dry film thicknesses. It is therefore the thickness of the cured film in each case. Hence, where it is reported that a coating material is applied at a particular film thickness, this means that the coating material is applied in such a way as to result in the stated film thickness after curing.

Inventive Coating Composition:

The inventive coating composition comprises at least one graphene oxide containing at least one monovalent metal ion selected from the group consisting of lithium, potassium and mixtures thereof (GO-M), at least one binder B and/or at least one silane compound SC and at least one solvent S1. The inventive coating composition is therefore preferably a liquid coating composition at 23 °C.

Graphene Oxide Containing at Least One Monovalent Lithium and/or Potassium Ion:

For the preparation of graphene and graphene oxide, various methods are described in the state of the art. Basically, one can differentiate between two approaches: the 'top-down' and the 'bottom-up' approach. In the first technique graphite as starting material is mechanically, electrochemically or thermally exfoliated and oxidized to obtain graphene oxide. The most used 'top-down' techniques are the Hummers and the modified Hummers methods using strong oxidizers, like sulfuric acid, sodium nitrate or potassium permanganate in combination with a catalyst. A further 'top down' technique is the electrochemical approach where exfoliation is achieved by application of a current which causes different ionic species of the used electrolyte to intercalate into the graphite layers.

The graphene oxide containing at least one monovalent metal ion selected from the group consisting of lithium, potassium and mixtures thereof (GO-M) contained in the inventive coating composition are preferably obtained by addition of the respective metal salt solution to graphene oxide, sonification, filtration and drying of the residue. The graphene oxide in turn is preferably prepared by a two-step electrochemical exfoliation method in which a graphene rod is placed into a NaOH solution and an anionic current is applied using a two-electrode system to achieve exfoliation. In a subsequent step, an anionic electrolysis in sulfuric acid solution is performed to obtain graphene oxide.

The monovalent metal ions are selected from the group consisting of lithium, potassium and mixtures thereof. With particular preference, the monovalent metal ion is lithium. The use of graphene oxide containing lithium ions (i.e. graphene oxide functionalized with lithium ions) results in an excellent corrosion resistance of the organic coating composition or conversion coating compositions.

Surprisingly, the excellent corrosion resistance of the organic coating compositions and conversion coating compositions comprising a graphene oxide containing at least one monovalent metal ion selected from the group consisting of lithium, potassium and mixtures thereof (GO-M), preferably graphene oxide containing lithium ions, is already achieved if only small quantities of said graphene oxide (GO-M) are incorporated into the compositions. The coating composition preferably contains the at least one graphene oxide containing at least one monovalent metal ion selected from the group consisting of lithium, potassium and mixtures thereof (GO-M), preferably graphene oxide containing at least one lithium ion, in a total amount of 0.1 ppm to 5% by weight, more preferably 0.5 to 2% by weight, even more preferably 0.1 ppm to 1% by weight, even more preferably 0.1 ppm to 500 ppm, even more preferably 0.3 to 50 ppm, very preferably 0.35 to 1 ppm, based in each case on the total weight of the coating composition.

Binder B, Silane Compound SC:

The inventive aqueous coating composition comprises as second mandatory component (b) at least one binder B and/or at least one silane compound SC.

Binder B:

A "binder" in the context of the present invention and in accordance with DIN EN ISO 4618:2007-03 is the nonvolatile component of a coating composition, without pigments and fillers. Hereinafter, however, the expression is used principally in relation to particular physically curable polymers which optionally may also be thermally curable, examples being polyurethanes, polyesters, polyacrylates and/or copolymers of the stated polymers. Thus, the term "binder" in the sense of the present invention does not encompass curing agents or crosslinking agents used to crosslink the binders to effect film formation. A copolymer in the context of the present invention refers to polymer particles formed from different polymers. This explicitly includes both polymers bonded covalently to one another and those in which the different polymers are bound to one another by adhesion. Combinations of the two types of bonding are also covered by this definition.

In the context of the present invention, the term "physical curing" means the formation of a film through evaporation of solvents from polymer solutions or polymer dispersions. Typically, no crosslinking agents are necessary for this curing.

In the context of the present invention, the term "thermal curing" denotes the heat- initiated crosslinking of a coating film, using either self-crosslinking binders or a separate crosslinking agent in combination with a binder (external crosslinking). The crosslinking agent comprises reactive functional groups which are complementary to the reactive functional groups present in the binders so that a macroscopically crosslinked coating film is formed upon reaction of binder and crosslinker.

The binder components present in the inventive coating composition always exhibit at least a proportion of physical curing. If, therefore, it is said that the coating composition comprises binder components which are thermally curable, this of course does not rule out the curing also including a proportion of physical curing.

The selection and combination of suitable binders B is made in accordance with the desired and/or required properties of the coating system to be produced. Another criterion for selection are the desired and/or required curing conditions, more particularly the curing temperatures. The person skilled in the art is familiar with how such selection should be made, and is able to adapt it accordingly. In case the inventive coating composition is an aqueous coating composition, ionically or nonionically stabilized polymers are used binder B. Anionically stabilized polymers are known to be polymers modified with anionic groups and/or with functional groups which can be converted by neutralizing agents into anions (examples being carboxylate groups and/or carboxylic acid groups) to facilitate dissolution or dispersion in water. Nonionically stabilized polymers are polymers modified with polyoxyalkylene groups to increase their water-solubility or water-dispersibility. Suitable binders B are selected from the group consisting of (i) poly (meth) acrylates, more particularly hydroxy-functional and/or carboxylate-functional and/or amine-functional poly (meth) acrylates, (ii) polyurethanes, more particularly hydroxy-functional and/or carboxylate-functional and/or amine-functional polyurethanes, (iii) linear or branched polyesters or polyamide modified polyesters, more particularly linear or branched polyester polyols, (iv) polyethers, more particularly polyether polyols, (v) polyepoxides, (vi) phenoxy resins, (vii) copolymers of the stated polymers, and (vi) mixtures thereof, preferably polyepoxides, linear or branched polyesters and/or polyester polyurethane copolymers.

Suitable hydroxyl-functional polymers and/or resins have a hydroxyl number of 30 to 400 mg KOH/g solids, more preferred between 100 and 300 KOH/g solids, as determined according to DIN 53240-2:2007-11. In the case of pure poly (meth) acrylates, the OH number may also be determined with sufficient accuracy by calculation on the basis of the OH-functional monomers used. The acid number may be between 0 and 30 mg KOH/g solids, as determined according to DIN EN ISO 2114:2006-11.

The glass transition temperatures of the hydroxyl-functional polymers and/or resins, measured by means of DSC measurement in accordance with DIN EN ISO 11357-2:2014-07, is preferably between-150 and 100 °C, more preferably between-120 °C and 80 °C. Suitable polyester polyols are described in EP-A-0 994 117 and EP-A-1 273 640, for example. In one or more embodiments, polyurethane polyols are prepared by reaction of polyester polyol prepolymers with suitable di-or polyisocyanates, and are described in EP-A-1 273 640, for example. Suitable polysiloxane polyols are described in WO-A-01/09260, for example, and the polysiloxane polyols recited therein may be employed preferably in combination with other polyols, more particularly those having higher glass transition temperatures.

Suitable poly (meth) acrylate polyols have mass-average molecular weights $M_w$ of 1,000 to 20,000 g/mol, more particularly 1,500 to 10,000 g/mol, in each case measured by means of gel permeation chromatography (GPC) against a polystyrene standard.

Said poly (meth) acrylate polyols preferably contain at least one hydroxyl-functional monomer and optionally further monomers, for example alkyl (meth)acrylates and/or vinylaromatic monomers and/or acid-functional unsaturated monomers. Suitable hydroxy-functional monomers are hydroxyalkyl (meth)acrylates, such as more particularly 2-hydroxyethyl (meth)acrylate, 2-hydroxypropyl (meth) acrylate, 3-hydroxypropyl (meth)acrylate, 3-hydroxybutyl (meth)acrylate, 4-hydroxybutyl (meth)acrylate and mixtures thereof. Suitable alkyl (meth)acrylates are, for example, ethyl (meth)acrylate, propyl (meth)acrylate, isopropyl (meth)acrylate, butyl (meth)acrylate, isobutyl (meth)acrylate, tert-butyl (meth) acrylate, amyl (meth) acrylate, hexyl (meth)acrylate, ethylhexyl (meth)acrylate, 3,3,5-trimethylhexyl (meth) acrylate, stearyl (meth)acrylate or lauryl (meth)acrylate; cycloalkyl (meth)acrylates, such as cyclopentyl (meth)acrylate, isobornyl (meth)acrylate or cyclohexyl (meth)acrylate, and mixtures thereof. Suitable vinylaromatic monomers are, for example, vinyltoluene, alpha-methylstyrene or, in particular, styrene, amides or nitriles of acrylic or methacrylic acid, vinyl esters or vinyl ethers. Suitable acid-functional unsaturated monomers are, for example acrylic and/or methacrylic acid.

According to a first particularly preferred embodiment, the at least one binder B is selected from polyepoxides. Polyepoxides, in the sense of the present invention, are polymers comprising—on average—at least one epoxy group per molecule. The polyepoxides which can be used in accordance with the invention are preferably those selected from the group consisting of glycidyl ethers, such as bisphenol-A-diglycidyl ether, bisphenol-F-diglycidyl ether, epoxide-novalak, epoxide-o-cresol-novolak, 1,3-propane-, 1,4-butane-or 1,6-hexane-diglycidyl ethers and polyalkylene oxide glycidyl ethers; glycidyl esters, such as diglycidyl hexahydrophthalate; glycidylamines, such as diglycidylaniline or tetraglycidylmethylenedianiline; cycloaliphatic epoxides, such as 3,4-epoxycyclohexylepoxyethane or 3,4-epoxycyclohexylmethyl-3,4-epoxycyclohexanecarboxylate; and glycidyl isocyanurates, such as trisglycidyl isocyanurate. These compounds contain hydroxyl groups along the chain and epoxide groups at the ends. The capacity of the epoxy resins for crosslinking by the epoxide groups and by the hydroxyl groups changes according to their chain length. While the capacity for crosslinking by the epoxide groups falls as the chain length and molar mass go up, the crosslinking capacity by the hydroxyl groups rises as the chain length grows. In the context of the present invention it is possible, ultimately, to use all of the epoxy resins known per se to the skilled person, examples being the epoxy resins specified later on below and available commercially, which may be obtained as a solution or dispersion in organic solvents or water. With particular preference, the at least one binder B has an epoxy equivalent weight (EEW) of 100 to 400 g/Eq., preferably 150 to 350 g/Eq., very preferably 200 to 300 g/Eq., as determined according to DIN EN ISO 3001:1999-11.

In case the at least one binder B is selected from polyepoxides, it is particularly preferred if the at least one binder B is selected from a mixture of two different polyepoxides, wherein the first polyepoxide B1 has a kinematic viscosity of 0.5 to 2 Pa*s—as determined by ASTMD 445-06—and the second polyepoxide B2 has a dynamic viscosity of 800 to 1400 mPa*s—as determined according to DIN EN ISO 3219:1994-10 at a shear rate of 500 1/s and 23 °C. The use of said mixture of polyepoxides results—in combination with the graphene oxide containing at least one monovalent metal ion selected from the group consisting of lithium, potassium and mixtures thereof (GO-M), preferably graphene oxide functionalized with at least one lithium ion—in an excellent corrosion resistance without negatively influencing the high storage stability, pot life, adhesion to the substrate and interlayer adhesion.

Epoxy resins of this kind may be obtained, in the form for example of a solution or dispersion in organic solvents or water, under the trade name Beckopox from the company Cytec or under the trade name Epikote from the company Momentive. According to a second particularly preferred embodiment, the at least one binder B is selected from linear and/or branched polyesters, preferably linear polyesters. The use of a combination of linear and branched polyesters allows to tune the flexibility of the coating composition by modifying the ratio between said polyesters, thus allowing to adapt the inventive coating composition to the particular intended use of the coated substrate.

In this regard, the at least one linear polyester preferably has a weight average molecular weight of 2,000 to 30,000 g/mol, more preferably 2,500 to 25,00 g/mol, even more preferably 3,000 to 20,000 g/mol, very preferably 3,000 to 17,000 g/mol, as determined according to DIN EN ISO 16014-5.

In case the binder B is selected from polyesters, it is favorable if the coating composition comprises at least two different linear polyesters P1 and P2, the polyester P1 having a weight average molecular weight of 2,000 to 9,000 g/mol, preferably 3,000 to 6,000 g/mol and the linear polyester P2 having a weight average molecular weight of 10,000 to 20,000 g/mol, preferably 14,000 to 16,000 g/mol, the weight average molecular weight being determined in each case according to DIN EN ISO 16014-5.

Suitable weight ratios of the at least one linear polyester P1 to the at least one polyester P2 are, for example, 2:1 to 1:2, preferably 2:1 to 1:1.

The at least one linear polyester preferably has a hydroxyl number of 20 to 100 mg KOH/g, preferably 30 to 80 mg KOH/g, more preferably 40 to 70 mg KOH/g, as determined according to DIN 53240-3:2016-03.

Suitable linear polyesters have a glass transition temperature $T_g$ of 30 to 80 °C, preferably 40 to 70 °C, more preferably 45 to 65 °C, as determined according to DIN EN ISO 11357-2:2014 measured by Differential Scanning Calorimetry.

Such linear polyesters are, for example, commercially available under the tradenames Dynapol L 205 (Degussa) and Uralac SH 970 (DSM).

Favorably, the coating composition comprises the at least one binder B, preferably the at least one polyepoxide or the at least one linear polyester, in a total amount of 1 to 40% by weight solids, preferably 5 to 30% by weight solids, very preferably 15 to 20% by weight solids, based in each case on the total amount of the coating composition. Use of the afore-stated amounts of binder ensures a sufficient and stable film formation on the substrate.

Silane Compound SC:

In case the inventive coating composition is a conversion coating, it preferably contains at least one silane compound SC.

Said silane compound SC is preferably selected from silane compounds comprising at least one primary amino group and at least one hydrolysable alkoxy group.

Particularly preferred silane compounds SC have the general formula (I)

$$NH_2—R^1—Y—R^2—Si(R^a)_{3-x}(R^b)_x \quad (I)$$

wherein $R^1$, $R^2$ are, independently from each other, an alkylene group containing 1 to 10 carbon atoms;

$R^a$ is an alkoxy group containing 1 to 4 carbon atoms;

$R^b$ is an alkyl group containing 1 to 4 carbon atoms or an alkoxy group containing 1 to 4 carbon atoms;

Y is oxygen, sulfur or an $NR^3$ group with $R^3$ being hydrogen or an alkyl group containing 1 to 4 carbon atoms; and X being 0 to 1.

Preferably, R1 is a Cz alkylene group and/or $R^2$ is a $C_3$ alkylene group.

Moreover, $R^a$ in general formula (I) is an alkoxy group containing 1 carbon atom and x is 0.

Y in general formula (I) is an NH group.

A particularly preferred silane compound SC is (3-(2-aminoethylamino) propyltrimethoxy silane, i.e. $R^1$ is a $C_2$ alkylene group, $R^2$ is a $C_3$ alkylene group, $R^a$ is an alkoxy group containing 1 carbon atom, x is 0 and Y is an NH group.

The coating composition preferably comprises the at least one silane compound SC, preferably the silane compound of general formula (I), in a total amount of 2 to 20% by volume, more preferably 5 to 15% by volume, based in each case on the total volume of the coating composition. Use of the aforementioned amounts of the silane compound SC in combination with the graphene oxide containing at least one monovalent metal ion selected from the group consisting of lithium, potassium and mixtures thereof (GO-M) results in coating compositions providing an excellent adhesion as well as corrosion resistance to substrates treated with said compositions.

Solvent S1:

The inventive aqueous coating composition comprises as third mandatory component (c) at least one solvent S1.

Suitable solvents S1 are selected from the group consisting of water, aliphatic and/or aromatic hydrocarbons, ketones, esters, or mixtures thereof. In case the solvent S1 is selected from water, the coating composition is an aqueous coating composition. In case the inventive coating composition is a solvent-based coating composition, it comprises at last one organic solvent S1. Organic solvents are used which do not inhibit the crosslinking of the coating compositions of the invention and/or do not enter into chemical reactions with the other constituents of the coating compositions of the invention. The skilled person is therefore able to select suitable solvents easily on the basis of their known solvency and their reactivity. Particularly preferred organic solvents S1 are selected from xylene and/or methoxypropanol or aliphatic hydrocarbons and methoxypropyl acetate and butyldiglycol acetate and dibasic esters. The coating composition of the invention is preferably a liquid coating composition at a temperature of 23 ° ° C. Therefore, the coating composition favorably contains the at least one solvent S1 in a total amount of 10 to 95% by weight, preferably 20 to 90% by weight, very preferably 25 to 60% by weight, based in each case on the total weight of the coating composition.

Crosslinker CL:

Since the afore-stated preferred binders B generally do not have film-forming properties on their own, corresponding crosslinking agents are used additionally when such resins are employed. Thus, the inventive coating composition preferably further comprises at least one crosslinker CL. Said crosslinker CL is preferably selected from the group consisting of amino resins, unblocked polyisocyanates, blocked polyisocyanates, polycarbodiimides, phenalkamine curing agents, polyaminoamide resins, melamine resins, resins comprising carboxylic acid groups, beta-hydroxyalkylamides, tris(alkoxycarbonylamino) triazines and mixtures thereof, very preferably phenalkamine curing agents and/or polyaminoamide resins and/or blocked or aromatic polyisocyanates and/or melamine resins.

If epoxy resins are used as binders B, the at least one crosslinker CL is preferably selected from phenalkamines and/or polyaminoamide compounds. Phenalkamines and polyaminoamides belonging to the general class of "polyamines" being a collective designation for organic compounds having two or more amino groups, examples being diamines or triamines. Besides the amino groups, the compounds in this case have an aliphatic or aromatic parent structure-that is, they consist, for example, of amino groups and aliphatic groups or amino groups and aromatic groups (aliphatic or aromatic polyamines). The polyamines may of course also contain aliphatic and aromatic units and also, optionally, further functional groups. Examples of aliphatic polyamines are diethylenetriamine, triethylenetetramine, 3,3',5-trimethylhexamethylenediamine, 1,2-cyclohexyldiamine and isophoronediamine. Examples of aromatic amines are methylenedianiline and 4,4-diaminodiphenyl sulfone. The generic term "polyamines" likewise embraces organic compounds which are prepared, for example, from an aliphatic or aromatic polyamine (as so-called base polyamine) by reaction of at least some of its amino groups with other organic compounds, in order thereby to influence various properties such as the reactivity and/or the solubility of the compounds and/or else to exert influence over the properties of the coating produced from the coating composition in question (surface hardness, for example). Such compounds, then, constitute adducts and, where they still contain at least two amino groups, may be designated as polyamine adducts or modified polyamines. They of course also have a higher molecular weight than the. aforementioned polyamines, and so their detrimental effect on health is reduced. Such polyamine adducts frequently constitute reaction products of aliphatic and/or aromatic polyamines with polyepoxides, examples being the epoxy resins described above, or else with discrete difunctional compounds such as bisphenol A diglycidyl ether, in which case a stoichiometric excess of amino groups is used in comparison to the epoxide groups. These adducts are then used for curing the epoxy resins in the actual coating composition. One known example is the reaction product of 3,3',5-trimethylhexamethylenediamine as base polyamine with bisphenol A diglycidyl ether as epoxy resin. Likewise embraced by the generic term "polyamines", for example, are the conventional polyaminoamides, these being polymers which are prepared, for example, by condensation of previously described polyamines as base polyamine and polycarboxylic acids, more particularly diacarboxylic acids.

In one or more embodiments, the at least one crosslinker CL, preferably the polyamine, has an amine number of 100 to 300 mg KOH/g solids, preferably 140 to 200 mg KOH/g solids, as determined according to DIN 16945:1989-03.

It is furthermore preferred, if the at least one crosslinker CL, preferably the polyamine, has an active-H equivalent mass (mass of polyamine per mole of active hydrogen (NH groups), i.e., hydrogen on primary and secondary amino groups) of 15 to 400 g/Eq. solids, more particularly of 150 to 300 g/Eq. solids (measured by way of the determination of primary and secondary amine groups in accordance with ASTM D2073).

Such polyamines or polyamine adducts or else polyaminoamides as reactants and/or crosslinking agents of epoxy resins may be obtained, for example, under the trade name Beckopox from the company Cytec or else under the trade name Cardolite (Cardolite NC-562, for example) from the company Cardolite.

If OH-functional resins, for example polyesters or OH-functional polyurethanes, are used as binder B, the at least one crosslinker CL is preferably selected from free and/or blocked polyisocyanates based on hexamethylene diisocyanate or isophorone diisocyanate and/or melamine resins. Such blocked polyisocyanates preferably have a deblocking temperature of 110 to 185 °C, very preferably 135 to 155 °C and can therefore be fully deblocked at curing temperatures of 180 to 240 °C. Suitable polyisocyanates include, without limitation, alkylene polyisocyanates such as hexamethylene diisocyanate, 4-and/or 2,4,4-trimethylhexamethylene diisocyanate, dodecamethylene diisocyanate, 1,4-diisocyanatocyclohexane, 1-isocyanato-3,3,5-trimethyl-5-isocyanatomethylcyclohexane (isophorone diisocyanate), 2,4'- and/or 4,4'-diisocyanatodicyclohexylmethane, 3-isocyanatomethyl-3,5,5-trimethyl cyclohexyl isocyanate, aromatic polyisocyanates such as 2,4'-and/or 4,4'-diisocyanatodiphenylmethane, 2,4-and/or 2,6-diisocyanatotoluene, naphthylene diisocyanate, and mixtures of these polyisocyanates. Generally, polyisocyanates having three or more isocyanate groups on average are used; these may be derivatives or adducts of diisocyanates. Useful polyisocyanates may be obtained by reaction of an excess amount of an isocyanate with water, a polyol (for example, ethylene glycol, propylene glycol, 1,3-butylene glycol, neopentyl glycol, 2,2,4-trimethyl-1,3-pentane diol, hexamethylene glycol, cyclohexane dimethanol, hydrogenated bisphenol A, trimethylolpropane, trimethylolethane, 1,2,6-hexanetriol, glycerine, sorbitol or pentaerythritol), or by the reaction of the isocyanate with itself to give an isocyanurate. Moreover, biuret-group-containing polyisocyanates, isocyanurate-group-containing polyisocyanates, urethane-group-containing polyisocyanates, carbodiimide group-containing polyisocyanates, allophanate group-containing polyisocyanates, and uretdione group-containing polyisocyanates can be used. With particular preference, hexamethylene diisocyanate or isophorone diisocyanate as well as blocked polyisocyanates based on hexamethylene diisocyanate or isophorone diisocyanate are used.

The at least one blocked polyisocyanate preferably has an NCO content of 4 to 12%, more preferably 4 to 10%, very preferably 4.6 to 8.6, based in each case on the solids content.

The melamine resin is preferably selected from melamine resins etherified with methanol, ethanol, propanol and/or butanol, preferably methanol, and contains—on average—0.05 to 3, preferably 0.07 to 2.5, very preferably 0.08 to 2, imino groups.

With preference, the coating composition contains the at least one crosslinker CL in a total amount of 1 to 30% by weight, preferably 5 to 20% by weight, very preferably 10 to 15% by weight, based in each case on the total weight of the coating composition. Use of the aforementioned crosslinking agent in the stated amounts results in sufficient crosslinking of the inventive coating composition and thus supports the corrosion inhibiting properties of the graphene oxide containing at least one monovalent metal ion selected from the group consisting of lithium, potassium and mixtures thereof (GO-M).

Curing Catalyst:

In order to accelerate the curing time, the inventive coating composition can further comprise at least one curing catalyst.

Suitable curing catalysts are selected from the group consisting of functionalized phenols, tin (IV) compounds, bismuth compounds, blocked or unblocked sulfonic acid compounds and mixtures thereof, preferably 2,4,6-tris(dimethylaminomethyl)phenol or tin (IV) alkoxylates and/or sulfonic acid compounds. Suitable sulfonic acid compounds are selected from dinonyl naphthaline mono sulfonic acid, dinonyl naphthaline disulfonic acid and/or docecylbenzene sulfonic acid.

The coating composition preferably contains the at least one curing catalyst in a total amount of 0.05 to 5% by weight, more preferably 0.1 to 3% by weight, very preferably 0.3 to 2.5% by weight, based in each case on the total weight of the coating composition.

Pigment/Filler:

The inventive coating composition can further comprise at least one pigment and/or filler. Pigments can be selected from color pigments, effect pigments and corrosion inhibiting pigments known to the person skilled in the art.

The term "pigment" is known to the skilled person from DIN 55945 (date: October 2001), for example. A "pigment" within the meaning of the present invention refers preferably to compounds in powder or platelet form which are insoluble substantially, preferably completely, in the medium surrounding them, such as in the coating composition of the invention. Pigments as defined herein differ from "fillers" at least in their refractive index, which for pigments is ≥1.7.

Suitable pigments are preferably selected from the group consisting of organic and inorganic color-imparting pigments (including black and white pigments), effect pigments and mixtures thereof.

Examples of suitable inorganic color-imparting pigments are white pigments such as zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow, or bismuth vanadate. Examples of further inorganic color-imparting pigments are e.g. aluminum oxide, aluminum oxide hydrate, in particular boehmite, titanium dioxide, zirconium oxide, cerium oxide and mixtures thereof. Examples of suitable organic color-imparting pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black. Effect pigments include metallic effect pigments, but also pearlescent pigments and the like.

The term "filler" is known to the skilled person, from DIN 55945 (date: October 2001), for example. A "filler" within the meaning of the present invention refers preferably to a substance which is substantially insoluble, preferably completely insoluble, in the coating composition of the invention, and is used more particularly for increasing the volume. "Fillers" within the meaning of the present invention at least differ from "pigments" in their refractive index, which for fillers is <1.7. Any customary filler known to the skilled person may be used. Examples of suitable fillers are kaolin, dolomite, calcite, chalk, calcium sulfate, barium sulfate, graphite, silicates such as magnesium silicates, more particularly corresponding phyllosilicates such as hectorite, bentonite, montmorillonite, talc and/or mica, silicas, more particularly fumed silicas, hydroxides such as aluminum hydroxide or magnesium hydroxide, or organic fillers such as textile fibers, cellulose fibers, polyethylene fibers, or polymer powders; for further details refer to Römpp Lexikon Lacke und Druckfarben, Georg Thieme Verlag, 1998, pages 250 ff., "Fillers".

While the afore-mentioned pigments and filler can suitably be employed in the coating composition of the present invention, such pigments containing environmentally problematic elements such as Pb, Cd, Cr, Cu, Mo, Hg, Se or Zn are less preferred and most preferably not included in the coating composition of the present invention.

The at least one pigment and/or filler is preferably contained in a total amount of 10 to 70% by weight, more preferably 20 to 60% by weight, very preferably 35 to 50% by weight, based in each case on the total weight of the coating composition. If more than one pigment and/or filler is present in the inventive coating composition, the aforestated amounts relate to the sum of the amounts of all pigments and/or fillers contained in said coating composition.

In case the inventive coating composition contains at least one color pigment, such as titanium dioxide, iron oxide, zinc oxide or organic pigments, such pigments are preferably present in a total amount of 5 to 20% by weight, more preferably 5 to 15% by weight, very preferably 7.5 to % by weight, based in each case on the total weight of the coating composition.

Suitable amounts of corrosion inhibiting pigments are 2 to 10% by weight, preferably 4 to 8% by weight, very preferably 4 to 6% by weight, based in each case on the coating composition.

The coating composition preferably comprises a pigment to binder ratio of 10:1 to 1:10, more preferably 6:1 to 1:6, even more preferably 5:1 to 1:2, very preferably 7:3 or 2:1 to 1:2.

Additive:

The coating composition can further contain at least one additive commonly used in aqueous and solvent-based coating compositions. Suitable coating additives are selected from the group consisting of are (i) UV absorbers; (ii) light stabilizers such as HALS compounds, benzotriazoles or oxalanilides; (iii) rheology modifiers such as sagging control agents (urea crystal modified resins), organic thickeners and inorganic thickeners; (iv) free-radical scavengers; (v) slip additives; (vi) polymerization inhibitors; (vii) defoamers; (viii) wetting agents; (ix) fluorine compounds; (x) adhesion promoters; (xi) leveling agents; (xii) film-forming auxiliaries such as cellulose derivatives; (xiii) flame retardants; and (xiv) mixtures thereof.

Examples of suitable wetting agents are polycarboxylic acid polymers, high molecular weight block copolymers, acrylic copolymers, unsaturated polyaminamides, carboxylic acid esters and mixtures thereof. Wetting agents are typically contained in a total amount of 0.1 to 1.5% by weight, preferably 0.2 to 0.5% by weight, based in each case on the total weight of the coating composition.

Suitable defoamers are silicon-free polymers with defoaming properties, polymethylalkyl siloxanes, polysiloxanes, acrylic resins and mixtures thereof. Defoaming agents are typically contained in a total amount of 0.1 to 1.5% by weight, very preferably 0.25 to 0.75% by weight, based in each case on the total weight of the coating composition.

Further additives listed above are preferably used in customary amounts, such as, for example, 0.1 to 20% by weight, based on the total weight of the coating composition.

In one or more specific embodiments, the inventive coating composition is completely free of chromium-containing corrosion inhibitors. In one more very specific embodiment, the inventive coating composition is completely free from chromium and chromium-containing substances, i.e. it contains no more than traces and impurities of chromium and chromium-containing substances, very preferably it contains 0% by weight, based on the total weight of the coating composition, of said substances.

Properties of the Inventive Coating Composition:

In case the inventive coating composition is a composition to be applied by spraying, it preferably has a Ford viscosity at 20 °C in a DIN 4 cup of 15 to 50 seconds, more preferably 20 to 45 seconds, very preferably 25 to 40 seconds.

If the inventive coating composition is formulated as a dip coating composition, it preferably has a viscosity at 23 °C and a shear rate of 150 s-1 of 200 to 1,000 mPa*s, very preferably of 500 to 800 mPa*s, as determined according to DIN EN ISO 3219:1994-10 and DIN 53019-2:2001-02.

If the inventive coating composition is formulated as a primer coating composition suitable for coil coating, it preferably has a viscosity of 12 to 120 s per 4 mm, as determined according to DIN 53211-4.

The solids content of the inventive coating composition may be varied according to the requirements of the individual case. The solids content is guided primarily by the viscosity required for the application, and may be adjusted by the skilled person on the basis of his or her general art knowledge. Preferably, the inventive coating composition has a solids content of 20 to 90% by weight, more specifically 30 to 80% by weight, and more particularly 40 to 60% by weight or 50 to 70% by weight, as determined according to DIN EN ISO 3251:2008-06.

The inventive coating composition can be formulated as a primer coating composition, a primer-surfacer coating composition, a filler coating composition, a conversion coating composition, an electrocoating composition or a dip coating composition. Depending on the specific use of the inventive coating composition, suitable binders B and solvents S1 are selected in order to adapt the film-forming and application properties to the specific intended use.

The inventive coating compositions can be formulated as one-component (1C) or multicomponent systems, i.e. systems comprising at least two separate components.

In one-component (1C) systems the components to be crosslinked—for example, the organic polymers as binders (B) and the crosslinking agents CL—are present alongside one another, namely in one component. A prerequisite for this is that the components to be crosslinked react with one another only at relatively high temperatures and/or on exposure to actinic radiation.

In two-component (2C) systems the components to be crosslinked—for example, the organic polymers as binders B and the crosslinking agents CL—are present separately from one another in at least two components, which are mixed shortly before application of the coating composition. This form is selected when the components to be crosslinked react with one another even at room temperature.

Preferably, the inventive coating compositions are formulated as two-component (2C) systems. Said systems preferably contain the at last binder B in a suitable solvent S1 in a first component and the at least one crosslinker CL in a suitable solvent S1 in the second component. The graphene oxide containing at least one monovalent metal ion selected from the group consisting of lithium, potassium and mixtures thereof (GO-M) can be contained either in the first or the second component. Preferably, the graphene oxide containing at least one monovalent metal ion selected from the group consisting of lithium, potassium and mixtures thereof (GO-M) is contained in the first component.

Process to Prepare Inventive Coating Composition

A further subject-matter of the present invention is a process for preparing an inventive coating composition, said process comprising the following steps:

(a) preparing a dispersion D of at least one graphene oxide comprising at least one monovalent metal ion selected from the group consisting of lithium, potassium and mixtures thereof (GO-M) in at least one solvent S2; and (b) adding the dispersion D prepared in step (a) to a mixture containing at least one binder B and/or at least one silane compound SC and at least one solvent S1.

Dispersion of the at least one graphene oxide containing at least one monovalent metal ion selected from the group consisting of lithium, potassium and mixtures thereof (GO- M) in the at least one solvent S2 can be effected by adding the respective graphene oxide containing at least one monovalent metal ion selected from the group consisting of lithium, potassium and mixtures thereof (GO-M) to at least one solvent S2 and dispersing said graphene oxide containing at least one monovalent metal ion selected from the group consisting of lithium, potassium and mixtures thereof (GO-M), for example by means of sonification.

The dispersion D prepared in step (a) preferably contains the at least one graphene oxide containing at least one monovalent metal ion selected from the group consisting of lithium, potassium and mixtures thereof (GO-M) in a total amount of 0.05 to 5% by weight, more preferably 1 to 4% by weight, very preferably 1.5 to 3% by weight, based in each case on the total weight of the dispersion. The aforestated amounts allow to disperse the graphene oxide containing at least one monovalent metal ion selected from the group consisting of lithium, potassium and mixtures thereof (GO-M) in a sufficiently high amount in the solvent S2 so that incorporation of the graphene oxide containing at least one monovalent metal ion selected from the group consisting of lithium, potassium and mixtures thereof (GO-M) into the inventive coating composition does not significantly influence its high solid content.

Suitable solvents S2 used for the dispersion of the graphene oxide containing at least one monovalent metal ion selected from the group consisting of lithium, potassium and mixtures thereof (GO-M) in step (a) are selected from the group consisting of aliphatic and/or aromatic hydrocarbons, ketones, esters, or mixtures thereof, preferably esters, very preferably ethyl acetate.

Preferably, the dispersion D contains the at least one solvent S2 in a total amount of 95 to 99.95% by weight, preferably 96 to 99% by weight, very preferably 97 to 98.5% by weight, based in each case on the total weight of the dispersion. Thus, the dispersion prepared in step (a) of the inventive process does favorably consists of the graphene oxide containing at least one monovalent metal ion selected from the group consisting of lithium, potassium and mixtures thereof (GO-M) and the solvent S2.

Suitable total amounts of the dispersion D added in step (b) are 0.1 to 10% by weight, preferably 1 to 7% by weight, very preferably 2 to 4% by weight, based in each case on the total weight of the prepared coating composition.

What has been said about the inventive coating composition applies mutatis mutandis with respect to further preferred embodiments of the inventive process.

Inventive Process to Prepare at Least One Coating Layer on a Substrate (S);

The inventive coating compositions as well as coating compositions prepared from the inventive process can be used to form a coating layer on a substrate.

In the method according to the invention, at least one coating layer is formed on a substrate (S) by the following steps:

(i) applying an inventive coating composition or a coating composition prepared by the inventive method directly on the substrate (S);
(ii) forming a film from the coating composition applied in step (i) by curing said coating composition; and
(iii) optionally applying at least one further coating composition to the coating layer formed in step (ii) and curing said coating composition.

The substrate (S) is preferably selected from metallic substrates, metallic substrates coated with a conversion coating and mixtures thereof. In case the inventive coating composition is comprising at least one silane compound SC, it is preferred if metallic substrates are used in step (i). If the inventive coating composition does not contain the at least one silane compound SC, a conversion coating layer can be applied to the substrate before step (i) is performed to improve the adhesion of the inventive coating composition by using conversion coating compositions known in the state of the art. With particular preference, chrome-free conversion coating compositions, for example Granodine 1455 or zinc phosphate coats are used within the inventive process. The conversion layer is preferably 20 to 300 nm thick and can be applied, for example, via chemcoater or by spraying/squeezing.

The substrates (S) may be pretreated before step (i) of the inventive process or before applying the conversion coating in any conventional way, for example by cleaning. Cleaning may be accomplished mechanically, for example, by means of wiping, sanding and/or polishing, and/or chemically by means of pickling methods, by incipient etching in acid or alkali baths, or by means of hydrochloric or sulfuric acid, for example. Cleaning with organic solvents or aqueous cleaners is also possible.

According to a first alternative, preferred metallic substrates are aluminum, aluminum alloys such as, more particularly, aluminum-copper alloys from the 2000er, 5000er, 6000er or 7000er series, very preferably AA6014 alloy, AA6016 alloy, AA6022 alloy, AA6111 alloy, AA6061 alloy, AA7075 alloy as well as AA5083 alloy, and also unalloyed and alloyed steel commonly used in the automobile sector. The substrates themselves may be of any shape-that is, for example simple metal panels or complex components such as automobile bodies and parts thereof.

According to a second alternative, preferred metallic substrates are structural steels which are optionally coated with a metallic coating and which are frequently used in coil coating processes. Suitable metallic coatings are selected from zinc/iron alloys, zinc/aluminum alloys, aluminum/zinc alloys, zinc/magnesium alloys, zinc/chromium or zinc/nickel alloys as well as zinc doped with aluminum.

Step (i):

In step (i) of the inventive process, an inventive coating composition or a coating composition prepared according to the inventive process is applied directly on the substrate. As used herein, the phrase, "applied directly to the substrate" means that before the coating composition is applied, no other coating material capable of forming an organic-polymeric matrix, or a conversion coating material, is applied in the inventive process. This, however, does not exclude the use of substrates already comprising a coating layer, for example a conversion coating layer as previously disclosed.

Depending on the substrate, application of the coating composition can be performed for example, by known techniques such as spraying, knife coating, spreading, pouring, dipping, impregnating, trickling or rolling. In case of metallic substrates used in the automotive sector, spraying or knife coating techniques are employed.

In case the coating composition applied in step (i) is used in a coil coating process, said composition may be applied by spraying, flow coating or roller coating. Of these application techniques, roller coating is particularly advantageous and is therefore used with preference in accordance with the invention. Each application step in roller coating may be conducted using two or more rolls. Preference is given to the use of from two to four, and especially two, rolls. In roller coating, the rotating pickup roll dips into a reservoir of the coating material of the invention and so picks up the coating material to be applied. This material is transferred by the pickup roll, directly or via at least one transfer roll, to the rotating application roll. From this latter roll, the coating material is transferred onto the coil by means of codirectional or counterdirectional contact transfer. Alternatively, the coating material of the invention may be pumped directly into a gap between two rolls, something which is also referred to as nip feed. In accordance with the invention, counterdirectional contact transfer, or the reverse roller coating process, is of advantage and is therefore employed with preference.

Step (ii):

In step (ii) of the inventive process, a polymer film is formed by curing the applied coating composition using known techniques. Preference is given to physical or thermal curing, since physically and thermally curing systems are preferred in the context of the present invention. Especially preferred is the thermal curing of externally crosslinking 2C systems.

According to a first alternative, the thermal curing preferably takes place at temperatures of 20 to 25 °C. These fairly low curing temperatures are possible due to the use of a binder/crosslinker system being an epoxy resin/polyamine system. The time period of thermal curing may vary greatly according to the particular case, and is for example between 5 minutes and 5 days, more particularly between 50 to 70 minutes.

According to a second alternative, the curing preferably takes place at temperatures of 140 to 240 °C by using convective heat transfer, irradiation with near or fear infrared and/or electrical induction. Said curing temperatures are preferred within the coil coating process where a continuous coil with the applied inventive coating composition thereon is passed through a convection oven such that the coil reaches a peak metal temperature (PTM) of 200 to 240 °C at the end of the oven. The dwell time in this oven is typically from 20 to 60 seconds, depending on the speed of the belt and the material of the coil. Preferably, forced air ovens with a length of from 30 to 50 m, in particular from 35 to 45 m, are used. The temperature of the forced air is preferably below 300 °C, in particular below 280 °C.

Preceding curing, depending on the individual case and binder/crosslinking agent systems used, may be a flash off at, for example, room temperature (about 15 and 25 °C) for 1 to 60 minutes, for example, and/or drying at, for example, slightly elevated temperatures of 30 to 80 °C for 1 to 60 minutes, for example. Flash off and drying in the context of the present invention means the evaporation of organic solvents and/or water, resulting in a dry but not yet fully crosslinked coating film.

The dry film thickness of the cured coating layer resulting after step (ii) is preferably 1 to 100 μm, more preferably 2 to 90 μm, very preferably 55 to 75 μm or 3 to 30 um. In case the inventive process is used to coat substrates to be used in the automotive and aviation sector, a higher dry film thickness of 15 to 100 μm is used while in the case of coil coating, dry film thicknesses of below 10 μm are preferred.

Step (iii):

In optional step (iii) of the present invention, at least one further coating composition is applied onto the cured coating film formed in step (ii) and said further coating composition is cured. The coated substrate obtained after step (ii) can be cooled down, for example by spraying of water onto the coated substrate, before step (iii) is performed. This is especially preferred if high curing temperatures are used in step (ii).

The at least one further coating layer is obtained by applying any customary and known coating materials capable of forming a coating layer based on a polymeric matrix. The application methods described above may also be employed for the coating materials with which the coatings of the invention are overcoated, except where they are powder coating materials or electrocoats, in which case the customary special application methods are used, such as electrostatic powder spraying in the case of low-speed coils or the powder cloud chamber process in the case of high-speed coils, and cathodic electrodeposition coating.

Application is then followed by the curing of the coatings in accordance with the techniques which are likewise known and customary. The individual coatings may also be produced by applying them successively without complete curing of the individual coats each time, and then curing them in a final, joint curing procedure (wet-on-wet method). It is of course also possible to cure the individual coats fully in each case.

The method of the invention preferably comprises the application and curing of at least one further coating material, to form a multilayer coating. In the context of the automotive industry, the further coats may, as is known, be customary surfacer coats, basecoats and clearcoats. It is therefore preferred that a multilayer coating is produced which-apart from the cured coating layer produced from the inventive coating composition-also comprises at least one surfacer coat, basecoat, and clearcoat, or consists of the stated coats. In the context of the coil coating or aviation industry, the at least one further coating composition may constitute the typical single-coat topcoat compositions based, for example, on (2-component) polyurethane, polyester, epoxy, melamine or phenol resin systems. In a likewise preferred variant of the present invention, therefore, a multilayer coating is produced which—apart from the cured coating layer produced from the inventive coating composition—also comprises a topcoat, or consists of these two coats.

In case the further coating material is a surfacer coat, basecoat, clearcoat or topcoat material commonly used in the automotive, curing in step (iii) is preferably performed at a temperature of 50 to 70 °C for a period of 20 to 40 minutes. The resulting dry film thickness of such surfacer coat and/or basecoat and/or clearcoat layer is—in each case—preferably 40 to 100 μm, more preferably 45 to 90 μm, very preferably 50 to 60 μm.

In case the further coating material is a topcoat material used in coil coating or aviation industry, curing in step (iii) is preferably performed at temperatures of 250 to 270 °C. (PMT) by convection ovens as previously described in step (ii). The dwell time is preferably around 10 to 30 seconds and the coated substrate may be cooled afterwards by spraying water onto said substrate. The resulting dry film thickness of the topcoat layer is preferably 1 to 15 μm, preferably 1 to 10 μm, very preferably 1 to 5 μm.

Following the production of the coated coils of the invention, they can be wound up and then processed further at another place; alternatively, they can be processed further as they come directly from the coil coating operation. For instance, they may be laminated with plastics or provided with removable protective films. After cutting into appropriately sized parts, they can be shaped. Examples of suitable shaping methods include pressing and deep drawing.

What has been said about the inventive coating composition and the inventive process to produce the coating composition applies mutatis mutandis with respect to further preferred embodiments of the inventive method.

Inventive Coating Layer or Multilayer Coating (MC):

The result after the end of step (ii) or (iii) of the process of the invention is a coating layer or multilayer coating (MC) of the invention.

What has been said about the inventive coating composition, the inventive process to produce the coating composition and the inventive method to produce a coated substrate applies mutatis mutandis with respect to further preferred embodiments of the inventive coating layer or multilayer coating.

Inventive Use:

A last subject-matter of the present invention is the use of at least one graphene oxide containing at least one monovalent metal ion selected from the group consisting of lithium, potassium and mixtures thereof (GO-M) in a composition to improve the corrosion resistance of said composition.

With preference, the composition is a coating composition, more preferably an organic coating composition.

According to an alternative embodiment, the composition is a sealant composition.

What has been said about the inventive coating composition, the inventive process to produce the coating composition, the inventive method to produce a coated substrate and the inventive coated substrate applies mutatis mutandis with respect to further preferred embodiments of the inventive use.

The invention is described in particular by the following embodiments:

Embodiment 1: coating composition comprising a) at least one graphene oxide containing at least one monovalent metal ion selected from the group consisting of lithium, potassium and mixtures thereof (GO-M);

b) at least one binder B and/or at least one silane compound SC; and c) at least one solvent S1.

Embodiment 2: coating composition according to embodiment 1, wherein the monovalent metal ion is lithium.

Embodiment 3: coating composition according to embodiment 1 or 2, wherein the coating composition contains the at least one graphene oxide containing at least one monovalent metal ion selected from the group consisting of lithium and/or potassium (GO-M), preferably graphene oxide containing lithium ions, in a total amount of 0.1 ppm to 5% by weight, preferably 0.1 ppm to 1% by weight, more preferably 0.1 ppm to 500 ppm, even more preferably 0.3 to 50 ppm, very preferably 0.35 to 1 ppm, based in each case on the total weight of the coating composition.

Embodiment 4: coating composition according to any of the preceding embodiments, wherein the at least one binder B is selected from the group consisting of (i) poly (meth) acrylates, more particularly hydroxy-functional and/or carboxylate-functional and/or amine-functional poly (meth) acrylates, (ii) polyurethanes, more particularly hydroxy-functional and/or carboxylate-functional and/or amine-functional polyurethanes, (iii) linear or branched polyesters or polyamide modified polyesters, more particularly linear or branched polyester polyols, (iv) polyethers, more particularly polyether polyols, (v) polyepoxides, (vi) phenoxy resins, (vii) copolymers of the stated polymers, and (vi) mixtures thereof, preferably polyepoxides, linear or branched polyesters and/or polyester polyurethane copolymers.

Embodiment 5: coating composition according to any of the preceding embodiments, wherein the at least one binder B has an epoxy equivalent weight (EEW) of 100 to 400 g/Eq., preferably 150 to 350 g/Eq., very preferably 200 to 300 g/Eq., as determined according to DIN EN ISO 3001:1999-11.

Embodiment 6: coating composition according to any of the preceding embodiments, wherein the at least one binder B is selected from a mixture of two different polyepoxides, wherein the first polyepoxide B1 has a kinematic viscosity of 0.5 to 2 Pa*s—as determined by ASTMD 445-06—and the second polyepoxide B2 has a dynamic viscosity of 800 to 1400 mPa*s—as determined according to DIN EN ISO 3219:1994-10 at a shear rate of 500 1/s and 23 °C.

Embodiment 7: coating composition according to any of embodiments 1 to 4, wherein the at least one binder B is selected from linear and/or branched polyesters, preferably linear polyesters.

Embodiment 8: coating composition according to embodiment 7, wherein the at least one linear polyester has a weight average molecular weight of 2,000 to 30,000 g/mol, preferably 2,500 to 25,00 g/mol, more preferably 3,000 to 20,000 g/mol, very preferably 3,000 to 17,000 g/mol, as determined according to DIN EN ISO 16014-5.

Embodiment 9: coating composition according to embodiment 7 or 8, wherein the coating composition comprises at least two different linear polyesters P1 and P2, the polyester P1 having a weight average molecular weight of 2,000 to 9,000 g/mol, preferably 3,000 to 6,000 g/mol and the linear polyester P2 having a weight average molecular weight of 10,000 to 20,000 g/mol, preferably 14,000 to 16,000 g/mol, the weight average molecular weight being determined in each case according to DIN EN ISO 16014-5.

Embodiment 10: coating composition according to embodiment 9, wherein the coating composition comprises a weight ratio of the at least one linear polyester P1 to the at least one polyester P2 of 2:1 to 1:2, preferably 2:1 to 1:1.

Embodiment 11: coating composition according to embodiments 7 to 10, wherein the at least one linear polyester has a hydroxyl number of 20 to 100 mg KOH/g, preferably 30 to 80 mg KOH/g, more preferably 40 to 70 mg KOH/g, as determined according to DIN 53240-3:2016-03.

Embodiment 12: coating composition according to any of embodiments 7 to 11, wherein the at least one linear polyester has a glass transition temperature $T_g$ of 30 to 80 °C, preferably 40 to 70 °C, more preferably 45 to 65 °C, as determined according to DIN EN ISO 11357-2:2014.

Embodiment 13: coating composition according to any of the preceding embodiments, wherein the coating composition comprises the at least one binder B, preferably the at least one polyepoxide or the at least one linear polyester, in a total amount of 1 to 40% by weight solids, preferably 5 to 30% by weight solids, very preferably 15 to 20% by weight solids, based in each case on the total amount of the coating composition.

Embodiment 14: coating composition according to any of the preceding embodiments, wherein the silane compound SC is selected from silane compounds comprising at least one primary amino group and at least one hydrolysable alkoxy group.

Embodiment 15: coating composition according to any of the preceding embodiments, wherein the silane compound SC has the general formula (I)

$$NH_2—R^1—Y—R^2—Si(R^a)_{3-x}(R^b)_x \quad (I)$$

wherein $R^1$, $R^2$ are, independently from each other, a alkylene group containing 1 to 10 carbon atoms;

$R^a$ is an alkoxy group containing 1 to 4 carbon atoms;

$R^b$ is an alkyl group containing 1 to 4 carbon atoms or an alkoxy group containing 1 to 4 carbon atoms;

Y is oxygen, sulfur or an $NR^3$ group with $R^3$ being hydrogen or an alkyl group containing 1 to 4 carbon atoms; and x being 0 to 1.

Embodiment 16: coating composition according to embodiment 15, wherein $R^1$ is a $C_2$ alkylene group and/or $R^2$ is a $C_3$ alkylene group.

Embodiment 17: coating composition according to embodiment 15 or 16, wherein $R^a$ is an alkoxy group containing 1 carbon atom and x is 0.

Embodiment 18: coating composition according to any of embodiments 15 to 17, wherein Y is an NH group.

Embodiment 19: coating composition according to any of the preceding embodiments, wherein the coating composition comprises the at least one silane compound SC, preferably the silane compound of general formula (I), in a total amount of 2 to 20% by volume, preferably 5 to 15% by volume, based in each case on the total volume of the coating composition.

Embodiment 20: coating composition according to any of the preceding embodiments, wherein the solvent S1 is selected from the group consisting of water, aliphatic and/or aromatic hydrocarbons, ketones, esters, or mixtures thereof, preferably water or xylene and/or methoxypropanol or aliphatic hydrocarbons and methoxypropyl acetate and butyldiglycol acetate and dibasic esters.

Embodiment 21: coating composition according to any of the preceding embodiments, wherein the coating composition contains the at least one solvent S1 in a total amount of 10 to 95% by weight, preferably 20 to 90% by weight, very preferably 25 to 60% by weight, based in each case on the total weight of the coating composition.

Embodiment 22: coating composition according to any of the preceding embodiments, wherein the coating composition further comprises at least one crosslinker CL preferably selected from the group consisting of amino resins, unblocked polyisocyanates, blocked polyisocyanates, polycarbodiimides, phenylalkamine curing agents, polyaminoamide resins, melamine resins, resins comprising carboxylic acid groups, beta-hydroxyalkylamides, tris (alkoxycarbonylamino) triazines and mixtures thereof, very preferably phenylalkamine curing agents and/or polyaminoamide resins and/or blocked or aromatic polyisocyanates and/or melamine resins.

Embodiment 23: coating composition according to embodiment 22, wherein the at least one crosslinker CL has an amine number of 100 to 300 mg KOH/g solids, preferably 140 to 200 mg KOH/g solids, as determined according to DIN 16945:1989-03.

Embodiment 24: coating composition according to embodiment 22 or 23, wherein the at least one crosslinker CL has an active hydrogen equivalent of 15 to 400 g/Eq. solids, preferably 150 to 300 g/Eq. solids.

Embodiment 25: coating composition according to embodiment 24, wherein the at least one crosslinker CL is selected from blocked polyisocyanates based on hexamethylene diisocyanate or isophorone diisocyanate and/or melamine resins.

Embodiment 26: coating composition according to embodiment 25, wherein the at least one blocked polyisocyanate has an NCO content of 4 to 12%, preferably 4 to 10%, more preferably 4.6 to 8.6, based in each case on the solids content.

Embodiment 27: coating composition according to embodiment 25 or 26, wherein the melamine resin is selected from melamine resins etherified with methanol, ethanol, propanol and/or butanol, preferably methanol, and contain—on average—0.05 to 3, preferably 0.07 to 2.5, very preferably 0.08 to 2, imino groups.

Embodiment 28: coating composition according to any of embodiments 22 to 27, wherein the coating composition contains the at least one crosslinker CL in a total amount of 1 to 30% by weight, preferably 5 to 20% by weight, very preferably 10 to 15% by weight, based in each case on the total weight of the coating composition.

Embodiment 29: coating composition according to any of the preceding embodiments, wherein the coating composition further comprises at least one curing catalyst.

Embodiment 30: coating composition according to embodiment 29, wherein the at least one curing catalyst is selected from the group consisting of functionalized phenols, tin (IV) compounds, bismuth compounds, blocked or unblocked sulfonic acid compounds and mixtures thereof, preferably 2,4,6-tris (dimethylaminomethyl) phenol or tin (IV) alkoxylates and/or blocked dinonyl naphthaline sulfonic acid.

Embodiment 31: coating composition according to embodiment 29 or 30, wherein the coating composition contains the at least one curing catalyst in a total amount of 0.05 to 5% by weight, preferably 0.1 to 3% by weight, very preferably 0.3 to 2.5% by weight, based in each case on the total weight of the coating composition.

Embodiment 32: coating composition according to any of the preceding embodiments, wherein the coating composition further comprises at least one pigment and/or filler.

Embodiment 33: coating composition according to embodiment 32, wherein the at least one pigment and/or filler is selected from the group consisting of (i) white pigments, such as titanium dioxide, zinc white, colored zinc oxide, zinc sulfide, lithopone; (ii) black pigments, such as iron oxide black, iron manganese black, spinel black, carbon black; (iii) color pigments, such as ultramarine green, ultramarine blue, manganese blue, ultramarine violet, manganese violet, iron oxide red, molybdate red, ultramarine red, iron oxide brown, mixed brown, spinel and corundum phases, iron oxide yellow, bismuth vanadate; (iv) filler pigments, such as silicon dioxide, silicon oxide, magnesium oxide, kaolin, quartz flour, aluminum oxide, aluminum hydroxide, natural mica, clay, natural and precipitated chalk, talc, barium sulphate, barite; (v) corrosion inhibiting pigments, such as silica pigments modified with calcium, zinc phosphates, aluminum phosphates, aluminum triphosphates, silica magnesium pigments; (vi) mixtures thereof.

Embodiment 34: coating composition according to embodiment 32 or 33, wherein the coating composition comprises the at least one pigment and/or filler in a total amount of 10 to 70% by weight, preferably 20 to 60% by weight, very preferably 35 to 50% by weight, based in each case on the total weight of the coating composition.

Embodiment 35: coating composition according to any of embodiments 32 to 34, wherein the coating composition comprises a pigment to binder ratio of 10:1 to 1:10, more preferably 6:1 to 1:6, even more preferably 5:1 to 1:2, very preferably 7:3 or 2:1 to 1:2.

Embodiment 36: coating composition according to any of the preceding embodiments, wherein the coating composition further comprises at least one coating additive selected from the group consisting of are (i) UV absorbers; (ii) light stabilizers such as HALS compounds, benzotriazoles or oxalanilides; (iii) rheology modifiers such as sagging control agents (urea crystal modified resins), organic thickeners and inorganic thickeners; (iv) free-radical scavengers; (v) slip additives; (vi) polymerization inhibitors; (vii) defoamers; (viii) wetting agents; (ix) fluorine compounds; (x) adhesion promoters; (xi) leveling agents; (xii) film-forming auxiliaries such as cellulose derivatives; (xiii) flame retardants; and (xiv) mixtures thereof.

Embodiment 37: coating composition according to any of the preceding embodiments, wherein the coating composition contains 0% by weight, based on the weight of the coating composition, of chromium and/or chromium-containing compounds.

Embodiment 38: coating composition according to any of the preceding embodiments, wherein the coating composition has a Ford viscosity at 20 °C in a DIN 4 cup of 15 to 50 seconds, preferably 20 to 45 seconds, very preferably 25 to 40 seconds.

Embodiment 39: coating composition according to any of embodiments 1 to 39, wherein the coating composition has a viscosity at 23 °C and a shear rate of 150 s-1 of 200 to 1,000 mPa*s, preferably of 500 to 800 mPa*s, as determined according to DIN EN ISO 3219:1994-10 and DIN 53019-2:2001-02.

Embodiment 40: coating composition according to any of embodiments 1 to 39, wherein the coating composition has a viscosity of 12 to 120 s per 4 mm, as determined according to DIN 53211-4.

Embodiment 41: coating composition according to any of the preceding embodiments, wherein it is a primer coating composition, a primer-surfacer coating composition, a filler coating composition, a conversion coating composition, a electrocoating composition or a dip coating composition.

Embodiment 42: a process for preparing a coating composition according to any of embodiments 1 to 41 comprising the following steps:

(a) preparing a dispersion D of at least one graphene oxide comprising at least one monovalent metal ion selected from the group consisting of lithium, potassium and mixtures thereof (GO-M) in at least one solvent S2; and (b) adding the dispersion D prepared in step (a) to a mixture containing at least one binder B and/or at least one silane compound SC and at least one solvent S1.

Embodiment 43: process according to embodiment 42, wherein the dispersion D contains the at least one graphene oxide comprising at least one monovalent metal ion selected from the group consisting of lithium, potassium and mixtures thereof (GO-M) in a total amount of 0.05 to 5% by weight, preferably 1 to 4% by weight, very preferably 1.5 to 3% by weight, based in each case on the total weight of the dispersion.

Embodiment 44: process according to embodiment 42 or 43, wherein the solvent S2 is selected from the group consisting of aliphatic and/or aromatic hydrocarbons, ketones, esters, or mixtures thereof, preferably esters, very preferably ethyl acetate.

Embodiment 45: process according to any of embodiments 42 to 44, wherein the dispersion D contains the at least one solvent S2 in a total amount of 95 to 99.95% by weight, preferably 96 to 99% by weight, very preferably 97 to 98.5% by weight, based in each case on the total weight of the dispersion.

Embodiment 46: process according to any of embodiments 42 to 45, wherein the dispersion D is added in a total amount of 0.1 to 10% by weight, preferably 1 to 7% by weight, very preferably 2 to 4% by weight, based in each case on the total weight of the prepared coating composition.

Embodiment 47: method of forming at least one coating layer on a substrate(S) comprising the following steps:

(i) applying a coating composition of any of embodiments 1 to 41 or a coating composition prepared by the process of any of embodiments 42 to 46 on the substrate(S);

(ii) forming a film from the coating composition applied in step (i) by curing said coating composition; and (iii) optionally applying at least one further coating composition to the coating layer formed in step (ii) and curing said coating composition.

Embodiment 48: method according to embodiment 47, wherein the substrate(S) is selected from metallic substrates, metallic substrates coated with a conversion coating and mixtures thereof.

Embodiment 49: method according to embodiment 47 or 48, wherein the curing in step (ii) is performed at a temperature of 20 to 25 ° ° C. for a period of 50 to 70 minutes or at a temperature of 140 to 240 °C for 20 to 60 seconds.

Embodiment 50: method according to any of embodiments 47 to 49, wherein the dry film thickness obtained after step (ii) is 1 to 100 μm, preferably 2 to 90 μm, very preferably 55 to 75 μm or 3 to 30 μm.

Embodiment 51: method according to any of embodiments 47 to 50, wherein (iii) at least one further coating layer is applied onto the cured coating film formed in step (ii) and said further coating layer is separately or simultaneously cured.

Embodiment 52: method according to embodiment 51, wherein the curing in step (iii) is performed at a temperature of 50 to 70 °C for a period of 20 to 40 minutes or at a temperature of 200 to 300 °C for a period of 10 to 30 seconds.

Embodiment 53: method according to embodiment 51 or 52, wherein the dry film thickness of the at least one further coating layer is 1 to 100 μm, preferably 1 to 90 μm, very preferably 50 to 60 μm or from 1 to 5 μm.

Embodiment 54: coating layer or multilayer coating (MC) produced by the method as claimed in any of embodiments 47 to 53.

Embodiment 55: use of at least one graphene oxide containing at least one monovalent metal ion selected from the group consisting of lithium, potassium and mixtures thereof (GO-M) in a composition to improve the corrosion resistance of said composition.

Embodiment 56: Use according to embodiment 55, wherein the composition is a coating composition, preferably an organic coating composition.

Embodiment 57: Use according to embodiment 55, wherein the composition is a sealant composition.

EXAMPLES

The present invention will now be explained in greater detail through the use of working examples, but the present invention is in no way limited to these working examples. Moreover, the terms "parts", "%" and "ratio" in the examples denote "parts by mass", "mass %" and "mass ratio" respectively unless otherwise indicated.

1. Methods of Determination 1.1 Raman Spectroscopy

The structure of the produced graphene oxide was determined by Rama spectroscopy using Raman spectrometer RAM ARAMIS from Horiba Jobin Yvon Lab. An excitation wavelength of 532 nm (green laser) was used and the exposure time was 20 seconds with three repetitions. For the measurements, a 10% filter was used.

1.2 ICP-OES Analysis

The concentration of mono-or multivalent metal ions present in the graphene oxide is determined by ICP-OES with a Spectro Cirros CCD ICP-OES device and the program Smart Analyzer of Spectro Smart. The following spectral lines were applied for the different cations: $Ca^{2+}$=183 nm, $K^{+}$=404 nm, $Li^{+}$=460 nm, $Mg^{2+}$=279 nm, $Na^{+}$=330 nm, $Zn^{2+}$=206 nm, $Fe^{2+=238}$ nm, $Al^{3+}$=396 nm.

To this end, the concentration of the respective metal ions present in the filtrate obtained after filtration of the respective graphene oxide containing at least one monovalent metal ion is determined via ICP-OES and compared with the concentration of the metal ion salt solution used for the preparation of the respective graphene oxide containing at least one monovalent metal ion. The difference between the concentration of the metal ion salt solution used for the preparation of the respective graphene oxide containing at least one monovalent metal ion and the concentration of the metal ion in the filtrate is directly corresponding to the concentration of metal ions present in the graphene oxide.

1.3 Determination of Acidic Acid Salt Spray Mist Test to DIN EN ISO 9227 AASS

The acidic acid salt spray mist test is used for determining the corrosion resistance of a coating on a substrate. In accordance with DIN EN ISO 9227 (date: June 2017), the acidic acid salt spray mist test is carried out for aluminum substrate, for example aluminum AA6014. The samples for investigation here are in a chamber in which there is continuous misting with a 5% common salt solution with a controlled pH in the range from 3.1 to 3.3 at a temperature of 35 °C over a duration of 1008 hours. The mist deposits on the samples under investigation, covering them with a corrosive film of salt water.

Prior to the acidic acid salt spray mist test to DIN EN ISO 9227 AASS, the coatings on the samples under investigation are scored down to the substrate with a blade incision, allowing the samples to be investigated for their level of under-film corrosion (undermining) to DIN EN ISO 4628-8 (date: Mar. 1, 2013), since the substrate corrodes along the score line during the DIN EN ISO 9227 AASS salt spray mist test. As a result of the progressive process of corrosion, the coating is undermined to a greater or lesser extent during the test. The degree of undermining in [mm] is a measure of the resistance of the coating to corrosion. The average undermining level stated in the results later on below represents the average value of the individual values from two different panels assessed, with each individual value for a panel in turn being an average value of the undermining levels at 5 measurement points on the panel.

2. Preparation of Graphene Oxide Containing at Lithium Ions (GO@Li) and Dispersion D 2.1 Preparation of Graphene Oxide Containing at Lithium Ions (GO@Li)

The graphene oxide was produced by electrochemical exfoliation of graphite in a two-electrode cell at room temperature using a Statron 3252.1 power supply as follows: at first, a graphite rod (10 cm length, 1 cm diameter) and a platinum mesh electrode were placed into a 1 M NaOH solution for a 10 min pre-treatment of the graphite. A voltage of 10 V was applied between the electrodes with the positive terminal at the graphite (anode). After that, the solution was changed by a 0.5 M sulfuric acid and an electrolysis was carried out at different applied voltages between 1 V and 10 V in 1 V steps for 1 hr. The received dark grey solution was then sonicated for 2 h and in the event filtered (0.45 um pore size). The residue was collected and washed repeatedly with water and dried at 60 °C.

The presence of graphene oxide and the absence of any graphite in the obtained residue was determined by Raman spectroscopy as described in point 1.1. It is generally considered that a Raman spectrum in which the G band (around 1595 $cm^{-1}$) and the D band (around 1350 $cm^{-1}$) have the same height is indicative of graphene oxide, while a G band higher than the D band is indicative of graphite. The Raman spectra obtained from the residue exhibits a G and a D band of practically the same intensity, thus being characteristic for graphene oxide.

0.1 g of the graphene oxide previously prepared was put into a 50 ml test tube. 50 ml of 0.1 M concentrated lithium salt solution was added to the tube and the prepared mixture was sonicated for 24 h. The graphene oxide containing lithium ions was obtained after filtration (0.45 um pore size) and drying at 60 °C. As determined by ICP-OES as described in point 1.2, the prepared graphene oxide contains around 1.8 mmol of lithium ions.

2.2 Preparation of Dispersion D Containing GO@Li

The dispersion D containing the graphene oxide comprising lithium ions in a solvent S2 was prepared by dispersing the graphene oxide containing lithium ions prepared in point 2.1 (GO@Li) in an appropriate amount of ethyl acetate (see points 3 and Table 1 for amounts of GO@Li and ethyl acetate used to prepare the dispersion D).

3. Preparation of Conversion Coating Layers

Galvanized steel panels were degreased for 4 minutes at 60 ° ° C. with a 60 g/l ENPREP 144 solution and afterwards rinsed at room temperature with tap water for 2.5 minutes and another 2.5 minutes with distilled water. A coating composition was prepared by mixing 2.7 ml of dispersion D prepared according to point 2.2 (1 mg GO@Li per ml ethyl acetate) with a 10 V % solution of a silane compound SC of general formula (I) ($R^1$ is a $C_2$ alkylene group, $R^2$ is a $C_3$ alkylene group, $R^a$ is an alkoxy group containing 1 carbon atom, x is 0 and Y is an NH group) in an appropriate organic solvent. The degreased galvanized steel panels were treated with this coating composition at room temperature for 1 minute and afterwards dried at 80 °C for 10 minutes to obtain steel panels comprising the conversion coating layer containing graphene oxide functionalized with at least one lithium ion (GO@Li).

4. Preparation of Coating Compositions F1 to F3

The coating compositions F1 to F3 were prepared by mixing the respective composition F1-1 to F3-1 with a hardener H and diluting said mixture with the commercial product Glasurit 352-216 (available from BASF Coatings GmbH) as described hereinafter.

4.1 Preparation of Base Varnishes F1-1, F1-2 and F1-3

Base varnishes F1-1 to F3-1 were prepared according to the following general procedure:

First of all, positions 1 to 2 of Table 1 were pre-mixed and positions 2 to 4 were added during stirring with 1000 to 1500 rpm. After the addition is complete, stirring is continued for 10 minutes at 1500 rpm. Then, the remaining ingredients according to the amounts stated in Table 1 are added and the obtained mixture is stirred for 20 minutes in a high-speed dissolver stirrer. Subsequently, the mixture is dispersed in a small laboratory mill for 1 to 1.5 hours to a Hegmann fineness of 22 to 23 um. If necessary, additional methoxypropanol is added after grinding (see position 13 in Table 1).

TABLE 1

| | Ingredients used to prepare base varnishes F1-1 to F3-1 (all amounts are given in % by weight, based on the total weight of the respective coating composition) | | | |
|---|---|---|---|---|
| | Ingredient | F1-1 | F2-1 | F3-1* |
| 1 | liquid epoxy resin [1] | 22.63 | 20.75 | 20.90 |
| 2 | modified epoxy resin [2] | 5.75 | 5.28 | 5.31 |
| 3 | high molecular weight block copolymer with pigment affinic groups [3] | 0.53 | 0.48 | 0.49 |
| 4 | Xylene | 2.78 | 2.55 | 2.57 |
| 5 | Methoxypropanol | 3.26 | 2.99 | 3.01 |
| 6 | Bariumsulfate [4] | 17.26 | 15.83 | 15.94 |
| 7 | platy talc [5] | 22.92 | 21.01 | 21.17 |
| 8 | Xylene | 9.40 | 8.62 | 8.68 |
| 9 | Dispersion D1 [6] | — | 3.72 | — |
| 10 | Dispersion D2 [7] | — | — | 3.03 |
| 11 | titanium dioxide[8] | 9.59 | 8.79 | 8.86 |
| 12 | Methoxypropanol | 5.89 | 5.40 | 5.44 |
| 13 | Methoxypropanol | — | 4.59 | 4.61 |

*inventive

[1] exemplary commercial product: Epikote 834-X-80 (produced from bisphenol A and epichlorohydrin, 80% solids solution in xylene, EEW = 235-263 g/Eq., kinematic viscosity = 1 Pa*s (ASTM D445-06)) (supplied by Hexion)

[2] exemplary commercial product: Beckopox EM 460 (produced from bisphenol A, phenol and bisphenol A diglycidyl ether, 60% solids solution in isobutanol/xylene, dynamic viscosity = 800-1400 mPa*s (500 1/s, 23° C., DIN EN ISO 3219)) (supplied by Allnex)

[3] exemplary commercial product: Disperbyk 161 (30% solids in methoxyproplyacetate/butylacetate) (supplied by Byk Chemie GmbH)

[4] exemplary commercial product: Schwerspat EWO normal (oil number = 11) (supplied by Sachtleben Minerals)

[5] exemplary commercial product: Luzenac 10 M0 (oil number = 48) (supplied by Imerys Performance Additives)

[6] dispersion of 0.3 g graphene oxide in 15.91 g ethyl acetate

[7] dispersion of 0.3 graphene oxide containing lithium ions (GO@Li) in 12.81 g ethyl acetate

[8] exemplary commercial product: Titan Rutil R-900-28 WP (oil number = 15), supplied by Titanos

4.2 Hardener Composition H

The hardener H was prepared by mixing 49.6 grams Cardolite NC 562 (adducted phenalkamine curing agent, 65% solids, amine number=185, active hydrogen equivalent=174, supplied by Carodlite), 13.143 grams Merginamid L 190/70 (reactive polyaminoamide resin, 70% solids, amine number=155-185, active hydrogen equivalent=340, supplied by HOBUM Oleochemicals GmbH), 1.2 grams diethylentriamine and 0.4 grams Ancamine K54 (curing catalyst, tris-2,4,6-dimethylaminomethyl phenol, supplied by Evonik Industries AG).

4.3 Coating Compositions F1 to F3

The coating compositions F1 to F3 were prepared by mixing the respective base varnish F1-1 to F1-3 with the hardener H and diluting each mixture with the commercial product Glasurit 352-216 (available from BASF Coatings GmbH) to a spray viscosity of 21 s (DIN4 cup, 20 °C).

TABLE 2

| Composition of coating compositions F1 to F3 | | | |
|---|---|---|---|
| | F1 | F2 | F3* |
| Base varnish F1-1 [g] | 200.0 | — | — |
| Base varnish F2-1 [g] | — | 292.9 | — |
| Base varnish F3-1 [g] | — | — | 314.0 |
| Hardener H [g] | 31.2 | 41.9 | 45.2 |
| Glasurit 352-216 [Vol.-%] | 7 | 4 | 3 |

*inventive

4.4 Ingredients and Properties of Further Coating Compositions

4.4.1 Primer Coating Compositions

TABLE 3

| inventive coating composition of a primer (amounts in % by weight, based on the total weight of the coating composition) | | | |
|---|---|---|---|
| | Ingredients | Preferred amounts | Inventive Example |
| Binder B | Polyester resin[1] | 10.00-60.00 [13] | 48.41 [13] |
| | Modified epoxy resin[2] | 0.00-10.00 [13] | 5.20 [13] |
| | OH-functional polyurethane resin [3] | 0.00-10.00 [13] | 0.00 [13] |
| | OH-functional acrylic resin [4] | 0.00-10.00 [13] | 0.00 [13] |
| | OH-functional acrylic resin [5] | 0.00-20.00 [13] | 0.00 [13] |
| Cross-linker | Amino crosslinker [6] | 1.00-10.00 [13] | 2.74 [13] |
| | Blocked isocyanate compounds [7] | 0.00-10.00 [13] | 0.00 [13] |
| | Blocked isocyanate compounds [8] | 1.00-15.00 [13] | 8.89 [13] |
| Pig-ments | White pigment [9] | 2.00-20.00 | 10.94 |
| | Anti-settling agent [10] | 0.10-0.50 | 0.33 |
| | Corrosion protection pigment [11] | 0.00-5.00 | 4.38 |
| | Corrosion protection pigment [12] | 0.00-10.00 | 0.00 |
| | Synthetic grahite GHL | 0.00-5.00 | 0.00 |
| | Graphene oxide containing lithium ions | 0.05-10.00 | 0.98 |
| Solvent | Solvesso 150 ND | 0.00-10.00 | 5.47 |
| | Methoxypropylacetat | 0.00-10.00 | 4.45 |
| | Butyldiglykolacetat | 0.00-10.00 | 8.22 |

[1] exemplary commercial product: URALAC SN 989 S1F-60 (saturated polyester resin, 60%, in 30% Solvent Naphtha and 10% 1-Methoxy-2-propanyl acetate)

[2] exemplary commercial product: Epikote 834-X-80(epoxy resin produced from bisphenol A and epichlorohydrin that is supplied as 80% solids solution in xylene)

[3] exemplary commercial product: ALBERDINGK U 9000 VP, 35% ig i. WA or ALBERDINGK 4820, 35% ig i. WA (polyurethane dispersions, OH-functional)

[4] exemplary commercial product: ALBERDINGK AC 2403, 47% ig i.WA (acrylic dispersion, OH functional, OH content 1.8% based on solids)

[5] exemplary commercial product: ALBERDINGK AC 2486, 48% ig i. WA (acrylic dispersion)

[6] exemplary commercial product: Cymel 303, 98% ig (melamine resin HMMM)

[7] exemplary commercial product: VESTANADT EP-DS 1205, 42% ig i. WA (blocked isocyanate resin, aliphatic, NOC content: 4.6% based on solids) or Vestanat EP-DS 1076 (blocked isocyanate resin, aliphatic)

[8] exemplary commercial product: Desmodur BL 3370(blocked aliphatic polyisocyanate based on hexamethylene diisocyanate, 70%)

[9] exemplary commercial product: Titandioxid 2310

[10] exemplary commerical product: Aerosil 200

[11] exemplary commerical product: Shieldex C 303 (calcium silicate)

[12] exemplary commerical product: Heucophos ZPO (zinc phosphate)

[13] amount is based on solids of respective ingredient

The coating compositions listed in Table 3 can additionally comprise additives and fillers commonly used in primer coating compositions.

Preferred Parameters of Above Mentioned Primer Coating Composition:

Solid content: 20 to 70% by weight

- Pigment to binder ratio: 1.00:0.05-2.00
- Viscosity: 1,000-10,000 mPa*s
- Density: 1.050-1.400 g/cm$^3$ Preparation of Cured Coating Layers Using Said Primer Coating Compositions:

- Suitable substrates: Z (hot-dip galvanized steel), ZE (electrolytically galvanized steel), ZM (zinc-magnesium coated steel)
- Pretreatment: Granodine 1455 (pH-value 2.0-2.5, coating weight<8 mg Ti per m$^2$)
- Curing temperature (PMT, peak metal temperature): 200-250 °C.
- Dwell time: 20 to 60 s Preferred Parameters of Cured Primer Layers:

- Dry film thickness: 0.50-30.00 µm
- Solid density: 1.05-2.00 g/cm$^3$
- Elasticity: T-0 to 1 with tesa tear-off, <T-1 crack-free (determined by T-bend)

Crosslinking (MEK-DH, resistance against methylethylketone according to ÖNORM EN 13523-11): <50 DH (after curing, >100 MEK-DH if topcoat is used)

Degree of gloss: <50/60° (matt-silk-glossy)

4.4.2 Water Soluble Primer Compositions

TABLE 4 inventive coating composition of a water soluble primer (amounts in % by weight, based on the total weight of the coating composition)

| | Ingredients | Preferred ranges | Inventive Example |
|---|---|---|---|
| Binder B | Polyester resins or modified epoxy resins [1)] | 0.00-20.00 [13)] | 6.13 [13)] |
| | OH-functional acrylic resin [2)] | 20.00-40.00 [13)] | 29.04 [13)] |
| | OH-functional polyurethane resin [3)] | 10.00-20.00 [13)] | 13.99 [13)] |
| | OH-functional acrylic resin [4)] | 0.00-10.00 [13)] | 0.00 [13)] |
| | OH-functional acrylic resin [5)] | 0.00-10.00 [13)] | 0.00 [13)] |
| Cross-linker | Amino crosslinker [6)] | 0.00-20.00 [13)] | 0.00 [13)] |
| | Blocked isocyanate compounds [7)] | 1.00-20.00 [13)] | 14.57 [13)] |
| | Blocked isocyanate compounds [8)] | 0.00-10.00 [13)] | 0.00 [13)] |
| Pig-ments | White pigment [9)] | 1.00-10.00 | 8.47 |
| | Anti-settling agent [10)] | 0.15-0.50 | 0.26 |
| | Corrosion protection pigment [11)] | 0.00-5.00 | 0.00 |
| | Corrosion protection pigment [12)] | 0.00-5.00 | 0.00 |
| | Synthetic graphite GHL | 0.00-5.00 | 0.00 |
| | Graphene oxide containing lithium ions | 0.05-10.00 | 2.00 |
| Solvent | Distilled water | 20.00-70.00 | 25.54 |

[1)] exemplary commercial product: PHENODUR PW 165, 40 WA (modified epoxy resin, OH functional, cationically stabilized)
[2)] exemplary commercial product: ALBERDINGK XP 27401, 38% ig i.WA (acrylic dispersion, OH functional, OH content 1.8% based on solids)
[3)] exemplary commercial product: ALBERDINGK U 9000 VP, 35% ig i. WA or ALBERDINGK 4820, 35% ig i. WA (polyurethane dispersions, OH-functional)
[4)] exemplary commercial product: ALBERDINGK AC 2403, 47% ig i.WA (acrylic dispersion, OH functional, OH content 1.8% based on solids)
[5)] exemplary commercial product: ALBERDINGK AC 2486, 48% ig i. WA (acrylic dispersion)
[6)] exemplary commercial product: Cymel 303, 98% ig (melamine resin HMMM)
[7)] exemplary commercial product: VESTANADT EP-DS 1205, 42% ig i.WA (blocked isocyanate resin, aliphatic, NOC content: 4.6% based on solids) or Vestanat EP-DS 1076 (blocked isocyanate resin, aliphatic)
[8)] exemplary commercial product: BAYHYDUR BL XP 2706, 40% ig i. WA (blocked isocyanate resin, aliphatic, NOC content: 8.6% based on solids)
[9)] exemplary commercial product: Titandioxid 2310
[10)] exemplary commerical product: Aerosil R 972
[11)] exemplary commerical product: Shieldex C 303 (calcium silicate)
[12)] exemplary commerical product: Heucophos ZPO (zinc phosphate)
[13)] amount is based on solids of respective ingredient The coating compositions listed in Table 4 can additionally comprise additives and fillers commonly used in primer coating compositions.

Preferred Parameters of Water Soluble Primer Coating Composition:

Solid content: 10 to 50% by weight

Pigment to binder ratio: 1.00:0.05-2.00

Viscosity: 12-120 s/4 mm (DIN 53211-4).

pH value: 1.50-9.00

Density: 1.050-1.400 $g/cm^3$

Preparation of Cured Coating Layers Using Said Primer Coating Compositions:

Suitable substrates: Z, ZE, ZM

Optional pretreatment: Granodine 1455 (pH-value 2.0-2.5, coating weight<8 mg Ti per $m^2$)

Curing temperature (PMT): 140-250 °C.

Dwell time: 5 to 60 s

Preferred Parameters of Cured Primer Layers:

Dry film thickness: 0.20-20.00 μm

Solid density: 1.05-2.00 $g/cm^3$

Elasticity: T-0 to 1 with tesa tear-off, <T-1 crack-free (determined by T-bend)

Crosslinking (MEK-DH): <50 DH (after curing, >100 MEK-DH if topcoat is used)

Degree of gloss: <50/60° (matt-silk-glossy)

4.4.3 Topcoat Coating Compositions

TABLE 5 inventive coating composition of a topcoat (amounts in % by weight, based on the total weight of the coating composition)

| | Ingredients | Preferred ranges | Inventive Example |
|---|---|---|---|
| Binder B | Branched copolyester ($M_w$ = 4000 to 6000) or polyester-polyurethane resins [1)] | 0.00-45.00 [10)] | 0.00 [10)] |
| | Copolyester resins ($M_w$ = 3000 to 10000) [2)] | 0.00-45.00 [10)] | 0.00 [10)] |
| | Polyurethane resins ($M_w$ = 3000 to 150000) [3)] | 0.00-50.00 [10)] | 44.71 [10)] |
| Cross-linker | Amino crosslinker [4)] | 0.00-10.00 [10)] | 3.35 [10)] |
| | Blocked isocyanate crosslinker [5)] | 0.00-20.00 [10)] | 0.00 [10)] |
| | Blocked isocyanate crosslinker [6)] | 0.00-20.00 [10)] | 9.31 [10)] |
| Pig-ments | White pigment [7)] | 15.00-30.00 | 23.04 |
| | Anti-settling agent [8)] | 0.15-0.50 | 0.27 |
| | Matting agent [9)] | 0.20-3.50 | 2.15 |
| | Graphene oxide containing lithium ions | 0.05-5.00 | 0.80 |
| Sol-vents | Solvesso 150 ND | 0.00-25.00 | 0.00 |
| | Methoxypropylacetat | 5.00-10.00 | 5.54 |
| | Butyldiglykolacetat | 2.50-12.00 | 10.58 |
| | DBE | 0.00-10.00 | 0.00 |

[1)] exemplary commercial product: Dynapol LH 830, 60% ig (branched, saturated copolyester, Mw = 4000 g/mol)
[2)] exemplary commercial product: Dynapol LH 538, 65% ig (branched, saturated copolyester, $M_w$ = 3000 g/mol)
[3)] exemplary commercial product: Dynapol UB 790, 60% ig (linear polyurethane resin, $M_w$ = 3000 to 6000)
[4)] exemplary commercial product: Cymel 303, 98% ig (melamine resin HMMM)
[5)] exemplary commercial product: Desmodur BL 3370, 70% ig (blocked aliphatic isocyanate)
[6)] exemplary commercial product: Vestanat EP-B 1481 ND, 65% ig (isocyanate crosslinker, blocked with caprolactam)
[7)] exemplary commercial product: Titandioxid 2310
[8)] exemplary commercial product: Aerosil R 972
[9)] exemplary commercial product: Acematt 810
[10)] amount is based on solids of respective ingredient The coating compositions listed in Table 5 can additionally comprise additives and fillers commonly used in primer coating compositions.

Preferred Parameters of Topcoat Coating Compositions:

Solid content: 50 to 70% by weight

Pigment to binder ratio: 1.00:0.50-1.50

Viscosity: 1000-10000 mPa*s

Density: 1.100-1.350 $g/cm^3$

Preparation of Cured Coating Layers Using Said Primer Coating Compositions:

Suitable substrates: Z, ZE, ZM

Pretreatment: Granodine 1455 (pH-value 2.0-2.5, coating weight<8 mg Ti per $m^2$)

Curing temperature (PMT): 200-260 °C

Dwell time: 20 to 60 s

Preferred Parameters of Cured Primer Layers:

Dry film thickness: 10.00-30.00 μm

Solid density: 1.30-1.80 $g/cm^3$

Elasticity: T-0 with tesa tear-off, <T-1 crack-free (determined by T-bend)

Crosslinking (MEK-DH): <100 DH

Degree of gloss: 20-90/60° (matt-glossy)

4.4.4 Single Coat Coating Compositions

TABLE 6 inventive coating composition of a single coat (amounts in % by weight, based on the total weight of the coating composition)

| | Ingredients | Preferred ranges | Inventive Example |
|---|---|---|---|
| Binder B | Branched copolyester resin ($M_w$ = 4000-6000) or polyester-polyurethane resins or epoxy resins (epoxy molar mass: 200 to 1000) [1] | 20.00-30.00 [11] | 25.65 [11] |
| | Linear copolyester ($M_w$ = 5000) or branched copolyester ($M_w$ = 5000 to 8000) or polyester-polyurethane resins or polyurethane resins [2] | 0.00-25.00 [11] | 19.87 [11] |
| | Copolyester ($M_w$ = 15000 to 20000) [3] | 0.00-15.00 [11] | 0.00 [11] |
| Cross-linker | Amino crosslinker [4] | 0.00-10.00 [11] | 3.82 [11] |
| | Blocked isocyanate crosslinker [5] | 0.00-10.00 [11] | 0.00 [11] |
| | Blocked isocyanate crosslinker [6] | 0.00-25.00 [11] | 15.72 [11] |
| Pig-ments | White pigment [7] | 10.00-30.00 | 14.19 |
| | Anti-settling agent [8] | 0.15-0.50 | 0.27 |
| | Matting agent [9] | 0.00-2.50 | 0.00 |
| | Corrosion protection pigment [10] | 0.00-5.00 | 3.27 |
| | Graphene oxide containing lithium ions | 0.05-5.00 | 1.20 |
| Sol-vents | Solvesso 150 ND | 0.00-25.00 | 0.00 |
| | Methoxypropylacetat | 5.00-10.00 | 5.46 |
| | Butyldiglykolacetat | 2.50-10.00 | 8.19 |
| | DBE | 1.50-10.00 | 2.35 |

[1] exemplary commercial product: Dynapol LH 830, 60% ig (branched, saturated copolyester, $M_w$ = 4000 g/mol)
[2] exemplary commercial product: Dynapol LH 820, 55% ig (branched, saturated copolyester, $M_w$ = 3000 g/mol)
[3] exemplary commercial product: Dynapol L 205 (granules) (saturated polyester, $M_w$ = 150000)
[4] exemplary commercial product: Cymel 303, 98% ig (melamine resin HMMM)
[5] exemplary commercial product: Desmodur BL 3370, 70% ig (blocked aliphatic isocyanate)
[6] exemplary commercial product: Vestanat EP-B 1481 ND, 65% ig (isocyanate crosslinker, blocked with caprolactam)
[7] exemplary commercial product: Titandioxid 2310
[8] exemplary commercial product: Aerosil R 972
[9] exemplary commercial product: Acematt 810
[10] exemplary commercial product: Shieldex C 303 (calcium silicate)
[11] amount is based on solids of respective ingredient The coating compositions listed in Table 6 can additionally comprise additives and fillers commonly used in primer coating compositions.

Preferred Parameters of Single Coat Coating Compositions:
- Solid content: 40 to 70% by weight
- Pigment to binder ratio: 1.00:0.20-1.50
- Viscosity: 1000-10000 mPa*s
- Density: 1.100-1.400 g/$cm^3$ Preparation of Cured Coating Layers Using Said Primer Coating Compositions:
- Suitable substrates: Z, ZE, ZM
- Pretreatment: Granodine 1455 (pH-value 2.0-2.5, coating weight<8 mg Ti per $m^2$)
- Curing temperature (PMT): 200-260 °C
- Dwell time: 20 to 60 s Preferred Parameters of Cured Primer Layers:
- Dry film thickness: 3.00-30.00 μm (applied directly onto pretreatment)
- Solid density: 1.30-1.80 g/$cm^3$
- Elasticity: T-0 with tesa tear-off, <T-1 crack-free (determined by T-bend)
- Crosslinking (MEK-DH): <100 DH
- Degree of gloss: 20-90/60° (matt-glossy)

5. Preparation of Multilayer Coatings

Aluminum panels (AA 6014) were coated using [spraying apparatus] with the respective coating composition F1 to F3 directly after their preparation such that the dry film thickness after curing was 60 to 73 μm. Following the coating, the applied films were cured for 60 minutes at 23 °C.

Afterwards, a top coating composition was prepared by mixing the base varnish Glasurit Reihe 68 white, the hardener 922-138 and the rheology additive 352-216 (all products supplied by BASF Coatings GmbH) in a ratio of 4:1:1. This top coating composition was applied using [spraying apparatus] such that the dry film thickness after curing was 53 μm. Following the coating, the applied films were cured for 30 minutes at 60 °C.

6. Results of Acidic Acid Salt Spray Mist Test

The acidic acid salt spray mist test as described in point 1.2 was performed using the coated panels prepared according to point 5. The results obtained after cleaning the panels with distilled water and removing the rust after 1h and 24h with a knife after the end of the test are listed in Table 7. Differences in the absolute range by about 1 mm are difficult to evaluate technically and are therefore not meaningful.

TABLE 7

Results of acidic acid salt mist spray test after 28 days (all values are in [mm])

| Mulitlayer coating | After 1 h | After 24 h |
|---|---|---|
| MC1[1] (comparative) | 6.4 | 4.7 |
| MC2[2] (comparative) | 5.5 | 4.6 |
| MC2[3] (inventive) | 2.2 | 3.1 |

[1]aluminum panel coated with coating composition F1 and top coat (does not contain graphene oxide or graphene oxide containing lithium ions)
[2]aluminum panel coated with coating composition F2 and top coat (does contain graphene oxide)
[3]aluminum panel coated with inventive coating composition F3 and top coat (does contain graphene oxide comprising lithium ions)

As is apparent from Table 7, the inventive coating composition containing a graphene oxide functionalized with at least one lithium ion results in multilayer coatings (MC3) having improved corrosion resistance as compared to multilayer coatings only comprising graphene oxide (MC2) or multilayer coatings not comprising any graphene oxide (MC1). Thus, the incorporation of a graphene oxide functionalized with at least one lithium ion into a primer or primer-surfacer coating composition significantly improves the corrosion resistance of a multilayer coating containing said primer or primer-surfacer coating layer.

The invention claimed is:

1. A coating composition comprising
a) at least one graphene oxide comprising lithium (GO-M), wherein the at least one graphene oxide comprising lithium (GO-M) is functionalized with the lithium, wherein the at least one graphene oxide comprising lithium (GO-M) optionally comprises further functionalizations, wherein all further functionalizations are selected from the group consisting of monovalent metal counterions;
b) at least one binder B and/or at least one silane compound SC; and
c) at least one solvent S1, wherein the coating composition comprises the GO-M in an amount of 0.1 ppm to 5% by weight, based on the total weight of the coating composition.

2. The coating composition according to claim 1, wherein the coating composition comprises the at least one graphene oxide in an amount of 0.1 ppm to 2% by weight, based on the total weight of the coating composition.

3. The coating composition according to claim 1, wherein the coating composition comprises the at least one graphene oxide in an amount of 0.1 ppm to 1% by weight, based on the total weight of the coating composition.

4. The coating composition according to claim 1, wherein the at least one binder B is selected from the group consisting of (i) poly (meth) acrylates, (ii) polyurethanes, (iii) linear or branched polyesters or polyamide modified polyesters, (iv) polyethers, (v) polyepoxides, (vi) phenoxy resins, (vii) copolymers thereof, and (vi) mixtures thereof.

5. The coating composition according to claim 1, wherein the coating composition comprises the at least one binder B in an amount of 1 to 40% by weight solids, based on the amount of the coating composition.

6. The coating composition according to claim 1, wherein the coating composition comprises the at least one binder B in an amount of 5 to 30% by weight solids, based on the total amount of the coating composition.

7. The coating composition according to claim 1, wherein the silane compound SC has the general formula (I)

$$NH_2—R^1—Y—R^2—Si(R^a)_{3-x}(R^b)_x \quad \text{formula (I)}$$

wherein $R^1$, $R^2$ are, independently from each other, an alkylene group comprising 1 to 10 carbon atoms;

$R^a$ is an alkoxy group comprising 1 to 4 carbon atoms;

$R^b$ is an alkyl group comprising 1 to 4 carbon atoms or an alkoxy group comprising 1 to 4 carbon atoms;

Y is oxygen, sulfur or an $NR^3$ group with $R^3$ being hydrogen or an alkyl group comprising 1 to 4 carbon atoms; and X being 0 to 1.

8. The coating composition according to claim 1, wherein the coating composition comprises the at least one silane compound SC in an amount of 2 to 20% by volume, based on a total volume of the coating composition.

9. The coating composition according to claim 1, wherein the coating composition comprises the at least one silane compound SC in an amount of 5 to 15% by volume, based on a total volume of the coating composition.

10. The coating composition according to claim 1, wherein the solvent S1 is selected from the group consisting of water, aliphatic hydrocarbons, aromatic hydrocarbons, ketones, esters, and mixtures thereof.

11. The coating composition according to claim 1, wherein the coating composition comprises the at least one solvent S1 in an amount of 10 to 95% by weight, based on the total weight of the coating composition.

12. A process for preparing the coating composition according to claim 1 comprising the following steps:

(a) preparing a dispersion D of the at least one graphene oxide comprising lithium (GO-M) in at least one solvent S2; and (b) adding the dispersion D prepared in step (a) to a mixture comprising the at least one binder B and/or the at least one silane compound SC and at least one solvent S1.

13. The process according to claim 12, wherein the dispersion D comprises the at least one graphene oxide in an amount of 0.05 to 5% by weight, based on the total weight of the dispersion.

14. The process according to claim 12, wherein the dispersion D is added in an amount of 0.1 to 10% by weight, based on the total weight of the prepared coating composition.

15. A method of forming at least one coating layer on a substrate (S) comprising the following steps:

(iv) applying the coating composition prepared by the process of claim 10 on the substrate (S);

(v) forming a film from the coating composition applied in step (i) by curing said coating composition; and (vi) optionally applying at least one further coating composition to the coating layer formed in step (ii) and curing said coating composition.

16. A method of forming at least one coating layer on a substrate (S) comprising the following steps:

(i) applying the coating composition of claim 1 on the substrate (S);

(ii) forming a film from the coating composition applied in step (i) by curing said coating composition; and (iii) optionally applying at least one further coating composition to the coating layer formed in step (ii) and curing said coating composition.

17. A coating layer or a multilayer coating (MC) produced by the method of claim 16.

18. A method of using at least one graphene oxide comprising lithium (GO-M), wherein the at least one graphene oxide comprising lithium (GO-M) is functionalized with the lithium, wherein the at least one graphene oxide comprising lithium (GO-M) optionally comprises further functionalizations, wherein all further functionalizations are selected from the group consisting of monovalent metal counterions, the method comprising using the at least one graphene oxide in a composition to improve corrosion resistance of said composition, wherein the composition comprises the GO-M in an amount of 0.1 ppm to 5% by weight, based on the total weight of the composition.

* * * * *